United States Patent
Shattil

(10) Patent No.: US 7,286,604 B2
(45) Date of Patent: Oct. 23, 2007

(54) CARRIER INTERFEROMETRY CODING AND MULTICARRIER PROCESSING

(75) Inventor: Steve J Shattil, Boulder, CO (US)

(73) Assignee: Aquity LLC, San Diego, CA (US)

( * ) Notice: Subject to any disclaimer, the term of this patent is extended or adjusted under 35 U.S.C. 154(b) by 917 days.

(21) Appl. No.: 10/446,022

(22) Filed: May 27, 2003

(65) Prior Publication Data

US 2004/0243258 A1    Dec. 2, 2004

(51) Int. Cl.
*H04K 1/10* (2006.01)
(52) U.S. Cl. .................................. 375/260; 375/350
(58) Field of Classification Search ................ 375/260, 375/273, 316, 350, 347
See application file for complete search history.

(56) References Cited

U.S. PATENT DOCUMENTS 5,093,863 A * 3/1992 Galand et al. ............... 704/207
6,405,147 B1 * 6/2002 Fera ............................ 702/112

* cited by examiner

*Primary Examiner*—Emmanuel Bayard
(74) *Attorney, Agent, or Firm*—Connolly Bove Lodge & Hutz LLP

(57) ABSTRACT

Carrier Interferometry (CI) codes include families of orthogonal polyphase codes that have no length restrictions and can be used for direct-sequence and multicarrier coding. Quasi-orthogonal CI channel codes simultaneously improve probability-of-error performance and increase throughput. CI filtering, which is based on CI codes, enables filtering and correlation operations via sampling and adding. CI codes simplify transform operations, such as Fourier transforms, by reducing or eliminating complex multiplications. CI filtering may be used to simplify synthesis and analysis functions and allow all physical-layer processing operations to be consolidated into simple sub-carrier selection and weighting operations. Thus, CI processing enables a software-defined baseband processor.

9 Claims, 21 Drawing Sheets

$f_{n-1}:f_n$ $f_{n+1}:f_n$ $f_{n-1}:f_n$ $f_{n+1}:f_n$ $f_n:f_n$ $C(1) = [1 \; (1+i)/\sqrt{2} \; i \; (-1+i)/\sqrt{2} \; -1 \; (-1-i)/\sqrt{2} \; -i \; (1-i)/\sqrt{2}];$ $C(1)^* = [1 \; (1-i)/\sqrt{2} \; -i \; (-1-i)/\sqrt{2} \; -1 \; (-1+i)/\sqrt{2} \; i \; (1+i)/\sqrt{2}];$ $C(2) = [1 \; (-1+i)/\sqrt{2} \; -i \; (1+i)/\sqrt{2} \; -1 \; (1-i)/\sqrt{2} \; i \; (-1-i)/\sqrt{2}];$ $C(2)^* = [1 \; (-1-i)/\sqrt{2} \; i \; (1-i)/\sqrt{2} \; -1 \; (1+i)/\sqrt{2} \; -i \; (-1+i)/\sqrt{2}];$ $C(3) = [1 \; (1+i)/\sqrt{2} \; i \; (-1+i)/\sqrt{2} \; 1 \; (1+i)/\sqrt{2} \; i \; (-1+i)/\sqrt{2}];$ $C(3)^* = [1 \; (1-i)/\sqrt{2} \; -i \; (-1-i)/\sqrt{2} \; 1 \; (1-i)/\sqrt{2} \; -i \; (-1-i)/\sqrt{2}];$ $C(4) = [1 \; (-1+i)/\sqrt{2} \; i \; (-1-i)/\sqrt{2} \; 1 \; (-1+i)/\sqrt{2} \; i \; (-1-i)/\sqrt{2}];$ $C(4)^* = [1 \; (-1-i)/\sqrt{2} \; -i \; (-1+i)/\sqrt{2} \; 1 \; (-1-i)/\sqrt{2} \; -i \; (-1+i)/\sqrt{2}];$ $C(5) = [1 \; (-1-i)/\sqrt{2} \; -i \; (-1+i)/\sqrt{2} \; -1 \; (1+i)/\sqrt{2} \; i \; (1-i)/\sqrt{2}];$ $C(5)^* = [1 \; (-1+i)/\sqrt{2} \; i \; (-1-i)/\sqrt{2} \; -1 \; (1-i)/\sqrt{2} \; -i \; (1+i)/\sqrt{2}];$ $C(6) = [1 \; (1-i)/\sqrt{2} \; i \; (1+i)/\sqrt{2} \; -1 \; (-1+i)/\sqrt{2} \; -i \; (-1-i)/\sqrt{2}];$ $C(6)^* = [1 \; (1+i)/\sqrt{2} \; -i \; (1-i)/\sqrt{2} \; -1 \; (-1-i)/\sqrt{2} \; i \; (-1+i)/\sqrt{2}];$ $C(7) = [1 \; (1+i)/\sqrt{2} \; -i \; (1-i)/\sqrt{2} \; 1 \; (1+i)/\sqrt{2} \; -i \; (1-i)/\sqrt{2}];$ $C(7)^* = [1 \; (1-i)/\sqrt{2} \; i \; (1+i)/\sqrt{2} \; 1 \; (1-i)/\sqrt{2} \; i \; (1+i)/\sqrt{2}];$ $C(8) = [1 \; (-1+i)/\sqrt{2} \; -i \; (1+i)/\sqrt{2} \; 1 \; (-1+i)/\sqrt{2} \; -i \; (1+i)/\sqrt{2}];$ $C(8)^* = [1 \; (-1-i)/\sqrt{2} \; i \; (1-i)/\sqrt{2} \; 1 \; (-1-i)/\sqrt{2} \; i \; (1-i)/\sqrt{2}];$

FIG. 20A

|  | C(1) | C(1)* | C(2) | C(2)* | C(3) | C(3)* | C(4) | C(4)* | C(5) | C(5)* | C(6) | C(6)* | C(7) | C(7)* | C(8) | C(8)* |
|---|---|---|---|---|---|---|---|---|---|---|---|---|---|---|---|---|
| CI(1) | 0 | 8 | 0 | 0 | 0 | 0 | 0 | 0 | 4-4i | 0 | 0 | 4+4i | 0 | 0 | 0 | 0 |
| CI(1)* | 8 | 0 | 0 | 0 | 0 | 0 | 0 | 0 | 0 | 4+4i | 4-4i | 0 | 0 | 0 | 0 | 0 |
| CI(2) | 0 | 0 | 0 | 8 | 0 | 0 | 0 | 0 | 0 | 4-4i | 4+4i | 0 | 0 | 0 | 0 | 0 |
| CI(2)* | 0 | 0 | 8 | 0 | 0 | 0 | 0 | 0 | 4+4i | 0 | 0 | 4-4i | 0 | 0 | 0 | 0 |
| CI(3) | 0 | 0 | 0 | 0 | 0 | 8 | 0 | 4-4i | 0 | 0 | 0 | 0 | 4+4i | 0 | 0 | 0 |
| CI(3)* | 0 | 0 | 0 | 0 | 8 | 0 | 4+4i | 0 | 0 | 0 | 0 | 0 | 4-4i | 0 | 0 | 0 |
| CI(4) | 0 | 0 | 0 | 0 | 0 | 4+4i | 0 | 8 | 0 | 0 | 0 | 0 | 0 | 0 | 4-4i | 0 |
| CI(4)* | 0 | 0 | 0 | 0 | 4-4i | 0 | 8 | 0 | 0 | 0 | 0 | 0 | 0 | 0 | 0 | 4+4i |
| CI(5) | 4-4i | 0 | 0 | 4+4i | 0 | 0 | 0 | 0 | 0 | 8 | 0 | 0 | 0 | 0 | 0 | 0 |
| CI(5)* | 0 | 4+4i | 4-4i | 0 | 0 | 0 | 0 | 0 | 8 | 0 | 0 | 0 | 0 | 0 | 0 | 0 |
| CI(6) | 0 | 4-4i | 4+4i | 0 | 0 | 0 | 0 | 0 | 0 | 0 | 0 | 8 | 0 | 0 | 0 | 0 |
| CI(6)* | 4+4i | 0 | 0 | 4-4i | 0 | 0 | 0 | 0 | 0 | 0 | 8 | 0 | 0 | 0 | 0 | 0 |
| CI(7) | 0 | 0 | 0 | 0 | 4+4i | 0 | 0 | 0 | 0 | 0 | 0 | 0 | 0 | 8 | 0 | 4-4i |
| CI(7)* | 0 | 0 | 0 | 0 | 0 | 4-4i | 0 | 0 | 0 | 0 | 0 | 0 | 8 | 0 | 4+4i | 0 |
| CI(8) | 0 | 0 | 0 | 0 | 0 | 0 | 4-4i | 0 | 0 | 0 | 0 | 0 | 0 | 4+4i | 0 | 8 |
| CI(8)* | 0 | 0 | 0 | 0 | 0 | 0 | 0 | 4+4i | 0 | 0 | 0 | 0 | 4-4i | 0 | 8 | 0 |

FIG. 20B

CARRIER INTERFEROMETRY CODING AND MULTICARRIER PROCESSING

This application claims priority to PCT Appl. PCT/US01/50856, filed Dec. 26, 2001, which claims priority to U.S. Pat. Appl. No. 60/259,433, filed on Dec. 30, 2000.

FIELD OF THE INVENTION

The present invention relates to Carrier Interferometry (CI). More specifically, the invention relates to applications of CI to multicarrier processing, such as Fourier transforms and coding.

BACKGROUND OF THE INVENTION

CI uses basic concepts of quantum mechanics to provide substantial improvements to throughput and performance compared to conventional technologies, which are based solely on classical physics.

U.S. Pat. No. 5,955,992 provides the first disclosure of CI. PCT/US00/18113 describes applications of CI to coherence multiplexing and spatial interferometry. PCT Appl. PCT/US99/02838 describes applications of CI to direct-sequence code division multiple access (DS-CDMA). Applications of CI to DS-CDMA are also described in "High performance broadband DS-CDMA via carrier interferometry chip shaping" (C. R. Nassar and Z. Wu, 2000 International Symposium on Advanced Radio Technologies, Boulder, Colo., Sep. 6-8, 2000) and "MMSE frequency combining for CI/DS-CDMA" (Z. Wu and C. R. Nassar, IEEE Radio and Wireless Conference, Denver, Colo., Sep. 10-13, 2000).

The application of CI to multi-carrier code division multiple access (MC-CDMA) is described in "Introduction of carrier interference to spread spectrum multiple access" (C. R Nassar, B. Natarajan, and S. Shattil, IEEE Emerging Technologies Symposium, Dallas, Tex., 12-13 Apr. 1999). Applications of CI to time division multiple access (TDMA) are described in "Exploiting frequency diversity in TDMA through carrier interferometry" (B. Natarajan, C. R. Nassar, and S. Shattil, Wireless 2000: The $12^{th}$ Annual International Conference on Wireless Communications, Calgary, Alberta, Canada, Jul. 10-12, 2000).

CI may also be applied to orthogonal frequency division multiplexing (OFDM). N-point transforms used in OFDM, such as fast Fourier transforms (FFTs) and inverse FFTs (IFFTs), essentially map one set of data symbols onto another set of data symbols. Each transform of a transform pair provides the basis for mixing symbols together to form a code that can be reversed by the complementary transform. Various techniques have been developed to efficiently process Fourier transform algorithms, such as described in U.S. Pat. Nos. 6,169,723, 6,137,839, 5,987,005, 5,297,236, and 5,365,470.

One technique for implementing a Fourier-transform type of coding includes filtering a time-domain sequence of input symbols. A polyphase FIR filter bank can be implemented equivalently with an N-point DFT or inverse DFT (as illustrated by J. G. Proakis in "Digital Signal Processing," $3^{rd}$ edition, p 825-831). Linear FIR filtering performed via the DFT typically involves segmenting the input symbols into blocks. The blocks are processed via the DFT and/or the IDFT to produce a block of output data. Common filter techniques include the overlap-save method and the overlap-add method. The resulting output symbols are complex-weighted sums of the input symbols.

None of the prior-art references implement direct-sequence coding based on CI polyphase codes. None of the prior-art references exploit phase relationships between orthogonal CI carriers to simplify transform operations or approximations of transforms.

SUMMARY OF THE INVENTION

Principles of CI may be applied to many different types of signal processing. In one set of embodiments of the invention, samples values are collected and processed according to mathematical principles of CI. In one aspect of the invention, correlation and filtering (such as matched filtering) may be performed without multiplication. In another aspect of the invention, various types of spectrum analysis and synthesis may be performed with substantial reduction or elimination of complex multiplications and additions.

Some of the many wireless applications of the invention include local-area networks, cellular communications, personal communication systems, broadband wireless services, data link, voice radio, satellite links, tagging and identification, wireless optical links, campus-area communications, wide-area networks, last-mile communication links, and broadcast systems. The invention may be used in non-wireless communication systems, such as guided wave, cable, wire, twisted pair, and/or optical fiber.

Various aspects of the invention are applicable to many types of signal processing. Some of these types of processing include, but are not limited to, transducer-array processing, space-time processing, space-frequency processing, interferometry, filtering, wavelet processing, transform operations, frequency conversion, diversity processing, correlation, channel coding, error-correction coding, multiple-access coding, spread-spectrum coding, channel compensation, correlation, transmission-protocol conversion, security coding, and authentication. Other applications and embodiments of the invention are apparent from the description of preferred embodiments and the claims that follow.

BRIEF DESCRIPTION OF THE DRAWINGS

FIG. 20A shows a set of 16 octonary CI code vectors of length 8.

FIG. 20B shows correlations of the 16 octonary codes shown in FIG. 20A.

DESCRIPTION OF THE PREFERRED EMBODIMENTS

Figure 1A:
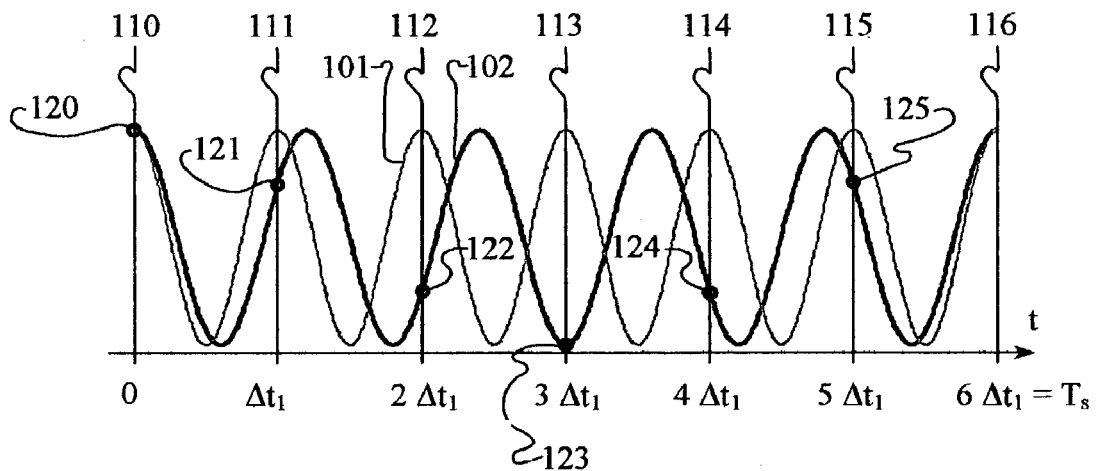
FIG. 1A illustrates phase relationships between two orthogonal sinusoidal waveforms that demonstrate a mathematical basis of CI processing.

The Description of the preferred embodiments assumes a familiarity with CI, such as described in PCT Appl. No. PCT/US99/02838, PCT Appl. No. PCT/US00/18113, and C. R. Nassar, et. al., *MultiCarrier Technologies for Next Generation Multiple Access*, Kluwer Academic Publishers: 2001, which are incorporated by reference.

Various terms used in the descriptions of CI methods and systems are generally described in this section. The descriptions in this section are provided for illustrative purposes only, and are not limiting. The meaning of these terms will be apparent to persons skilled in the relevant art(s) based on the entirety of the teachings provided herein. These terms may be discussed throughout the specification and the cited references with additional detail.

Carrier selection may include either or both transmit-side carrier selection with respect to one or more predetermined CI carrier parameters to generate at least one transmit signal and receive-side carrier selection to decompose at least one signal into CI components.

Carrier weights include complex values characterized by magnitude and/or phase.

Channel estimation involves measuring, calculating, or estimating one or more channel characteristics.

CI carrier parameters may include number of carriers, carrier frequency spacing(s), frequency offset, carrier bandwidth, and aggregate bandwidth.

CI Components are CI carriers or CI symbol values. CI symbol values are complex values (or weights) for a plurality of CI carriers. CI symbol values indicate magnitude and phase of corresponding CI carriers.

A CI symbol combiner describes a system, device, or algorithm adapted to generate basic and/or advanced CI codes. A CI symbol combiner may process multiple code chips to generate one or more CI codes.

A coherent combiner describes any system, algorithm, or device adapted to coherently combine code chips of an encoded signal with respect to at least one decoding signal (i.e., reference code). A coherent combiner may include a correlator or matched filter. A coherent combiner may apply phase offsets to information-bearing code chips with respect to the decoding signal such that the code chips can be combined in phase to produce a signal indicative of at least one information signal.

A combiner, as used herein, describes any system, device, and/or algorithm adapted to combine a plurality of signals.

A combiner may combine multiple carriers or symbol values to generate a superposition signal. A combiner may provide weights to compensate for noise, interference, and/or distortion. The weights may be based on channel estimates. The weights may be adapted relative to some performance measurement, such as probability of error, bit error rate (BER), signal-to-noise ratio (SNR), signal-to-noise-plus-interference ratio (SNIR), and/or any other appropriate signal-quality parameter. Performance measurements may include any combination of instantaneous and averaged performance measurements. Averaging may be performed over one or more diversity parameters. Various types of optimal combining may be performed. Possible combining techniques include EGC (equal-gain combining), ORC (orthogonality-restoring combining), and MMSEC (minimum mean squared error combining). A combiner may perform combining in more than one diversity-parameter space. For example, MMSEC may be performed in the frequency domain to generate a plurality of combined signals that are processed via equal-gain combining in the time domain.

Diversity parameters include signal characteristics, such as, but not limited to, frequency, temporal characteristics, phase, mode, amplitude, polarization, angle of arrival, polarization-rotation rate, phase-rotation rate, frequency rate-of-change, amplitude rate-of-change, angle-of-arrival rate-of-change, spatial gain distribution, etc An information signal, as used herein, describes one or more signals adapted to convey some form of useful information. Information signals may include any type of communication signal, such as, but not limited to, video, voice, data, and text. Information signals may include digital and/or analog signals. Information signals may include coded and/or interleaved data symbols.

A front-end receiver processor includes one or more signal-processing systems and/or functions typically adapted to process received information-bearing signals prior to baseband processing. Front-end receiver processing may include filtering, amplification, A/D conversion, mixing, intermediate-frequency (IF) processing, radio-frequency (RF) processing, serial-to-parallel conversion, parallel-to-serial conversion, demodulation, demultiplexing, multiple-access processing, frequency conversion, despreading, decoding, de-interleaving, and/or array processing.

A memory space refers to a disk drive, tape drive, CD, DVD, flash memory, or any other data storage media or device.

Pre-transmission processing includes one or more signal-processing functions typically applied to information-bearing baseband or IF signals prior to coupling into a communication channel. Pre-transmission processing may include predistortion, A/D conversion, D/A conversion, mixing, modulation, multiplexing, multiple-access processing, frequency conversion, spreading, amplification, filtering, coding, and/or array processing.

A processing unit refers to a computer processing unit, such as a microprocessor device, a main frame, a work station, a computer network, and/or a stand-alone computer.

CI processing applications of the present invention can be derived from phase relationships between orthogonal carrier frequencies. FIG. 1A illustrates first and second orthogonal sinusoidal waveforms 101 and 102. Each waveform 101 and 102 has an integer number of wavelengths over a particular symbol interval $T_s$. The first waveform 101 frequency $f_1$ is six cycles per symbol interval $T_s$. The second waveform 102 frequency $f_2$ is five cycles per symbol interval $T_s$.

Figure 2A:
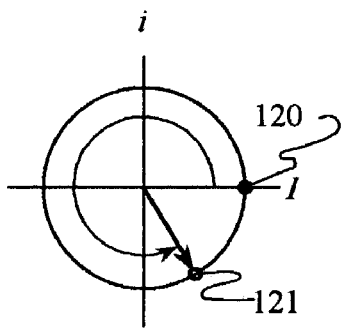
FIG. 2A illustrates a phase offset of adjacent samples shown in FIG. 1A.

A plurality of samples 120 to 125 of waveform 102 are selected at intervals of $\Delta t_1$, corresponding to periods 110 to 115 of waveform 101 over a symbol interval $T_s=6\Delta t_1$. In this case, the waveforms 101 and 102 are aligned in phase at times $t=0$ and $t=T_s$. At $t=\Delta t_1$, sample 121 occurs at ⅚ of waveform 102 period $\Delta t_2$. Each sample 120 to 125 can be represented by a value on a unit circle in the complex plane. For example, FIG. 2A shows a complex-plane representation of samples 120 and 121.

Figure 3A:
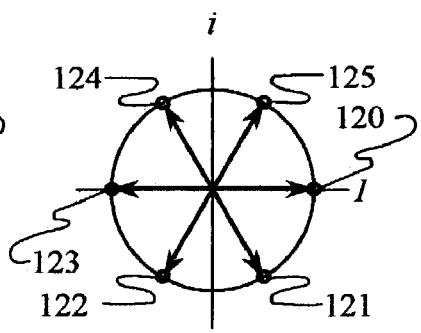
FIG. 3A shows samples distributed uniformly around a unit circle in the complex plane.

Since the sampling frequency $f_1$ exceeds the frequency $f_2$ of the sampled waveform 102, the phase shift of each successive sample 120 to 125 falls short of a full cycle of waveform 102. The waveforms 101 and 102 are orthogonal due to selection of an appropriate symbol interval $T_s$. Thus, the samples 120 to 125 are distributed uniformly across the unit circle in the complex plane, as illustrated by FIG. 3A. The sample values 120 to 125 cancel when they are summed.

Figure 1B:
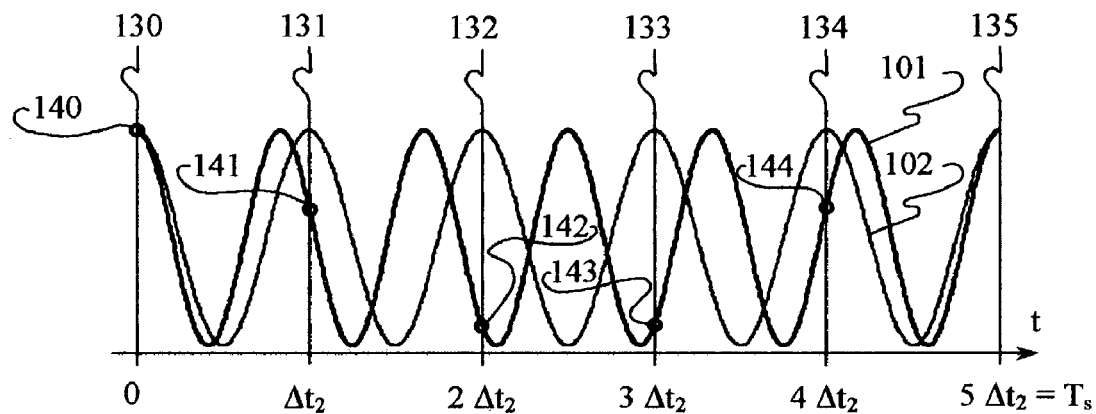
FIG. 1B illustrates relationships between two orthogonal sinusoidal waveforms.
Figure 2B:
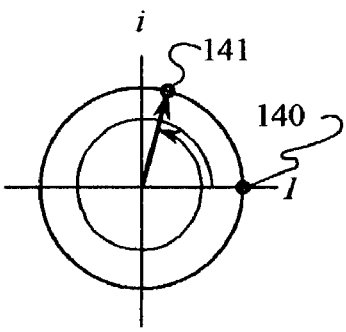
FIG. 2B illustrates a phase offset of adjacent samples shown in FIG. 1B.
Figure 3B:
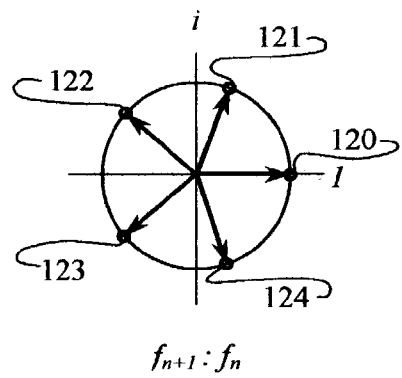
FIG. 3B shows samples distributed uniformly around a unit circle in the complex plane.

FIG. 1B illustrates a first waveform 101 sampled at intervals 130 to 135 relative to a sampling frequency $f_2$ of a second waveform 102. A symbol interval is expressed by $T_s=5\Delta t_2$. Each sample 140 to 144 corresponds to a phase shift that is greater than a full cycle of waveform 101, as illustrated by FIG. 2B. The orthogonality of the waveforms 101 and 102 ensures that the samples 140 to 144 are distributed uniformly around the unit circle in the complex plane, as shown by FIG. 3B. Samples 140 to 144 collected over a symbol interval $T_s$ cancel when summed.

Figure 3C:
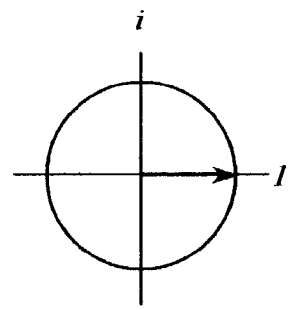
FIG. 3C is a normalized complex-plane representation of samples of a signal having a particular frequency collected at a sampling rate that equals or is some sub-harmonic frequency of the signal frequency. Each sample corresponds to an integer number of full rotations in the complex plane.

FIG. 3C shows a normalized complex-plane representation of samples (collected at a sampling rate $f_{sample}=f_n$) of a desired waveform having a frequency $f_n$. Since $f_{sample}=f_n$, the samples always occur on the same part of the unit circle in the complex plane. In this example, the samples occur at the peaks of the desired waveform and thus, occur on the real axis in the complex plane. The number of samples $N_s$ per symbol interval $T_s$ is expressed by:

$$N_s = f_{sample}T_s = (f_o+nf_s)/f_s$$

The number of samples per waveform period ($1/f_n$) is 1.

Nearby waveform frequencies $f_{n\pm n'}$ can be expressed as: $f_{n\pm n'}=f_o+(n\pm n')f_s$. The number of samples per period of a nearby waveform can be expressed as:

$$N_{n\pm n'} = \frac{f_{n\pm n'}}{f_{sample}} = 1 \pm \frac{n'f_s}{(f_o+nf_s)}$$

In the complex plane, the sampled values shift by an amount:

$$\phi_{n\pm n'} = \pm \frac{n'f_s}{(f_o+nf_s)}2\pi \text{ radians}$$

$N_s$ samples collected throughout the symbol interval $T_s$ are distributed uniformly on a unit circle in the normalized complex plane unless $f_{n\pm n'}$ is an integer multiple of $f_n$. The case in which $f_{n\pm n'}=mf_n$ (where m is some integer) can be avoided by appropriately frequency converting the received signal(s) and/or the sampling rate to ensure that the vector sum of the samples is zero.

The waveforms 101 and 102 in FIGS. 1A and 1B may express carrier frequencies, sub-carrier frequencies, orthogonal circular (or elliptical) polarization spin frequencies, array pattern scan frequencies, direct sequence code repetition rates, or frequencies of any other cyclical or repetitive signal phenomena or signal characteristic. Data symbols may be impressed onto each waveform 101 and/or 102 within each symbol interval $T_s$. The symbol interval $T_s$ and/or adjacent intervals may include guard intervals and/or cyclic prefixes, which are well known in the art. A process for separating a received signal into orthogonal waveforms may utilize knowledge of carrier separations $f_s$ (and, thus, $T_s=1/f_s$) of a transmitted multicarrier signal. Alternatively, a predetermined symbol interval $T_s$ may be used to decompose a received multicarrier or single-carrier signal into orthogonal components.

Orthogonal waveforms, such as waveforms 101 and 102, may be sampled at a sampling frequency $f_{sample}$ equal to a desired waveform frequency $f_n=f_o+nf_s$, or some harmonic or sub-harmonic thereof. The term $f_o$ indicates a base or carrier frequency and n is an integer. A number N of samples are represented by equally spaced time intervals, such as $\Delta t_1$, and $\Delta t_2$, corresponding to integer multiples of a desired waveform's period $T_s=1/f_s$. When N samples collected over a period $T_s$ are combined, a desired symbol value can be separated from interfering symbols on the other waveforms provided that no aliasing occurs. CI filtering methods may be combined with passband sampling. The improvement of CI filtering provides for combining samples collected over one or more symbol intervals $T_s$ to separate at least one desired symbol from symbols impressed on other waveforms.

In one aspect of CI filtering, orthogonal frequency channels are separated using only sampling and adding processes. One application of this invention includes frequency-division demultiplexing. CI filtering may be performed by receivers designed for multicarrier transmission protocols, such as OFDM and MC-CDMA.

Figure 4:
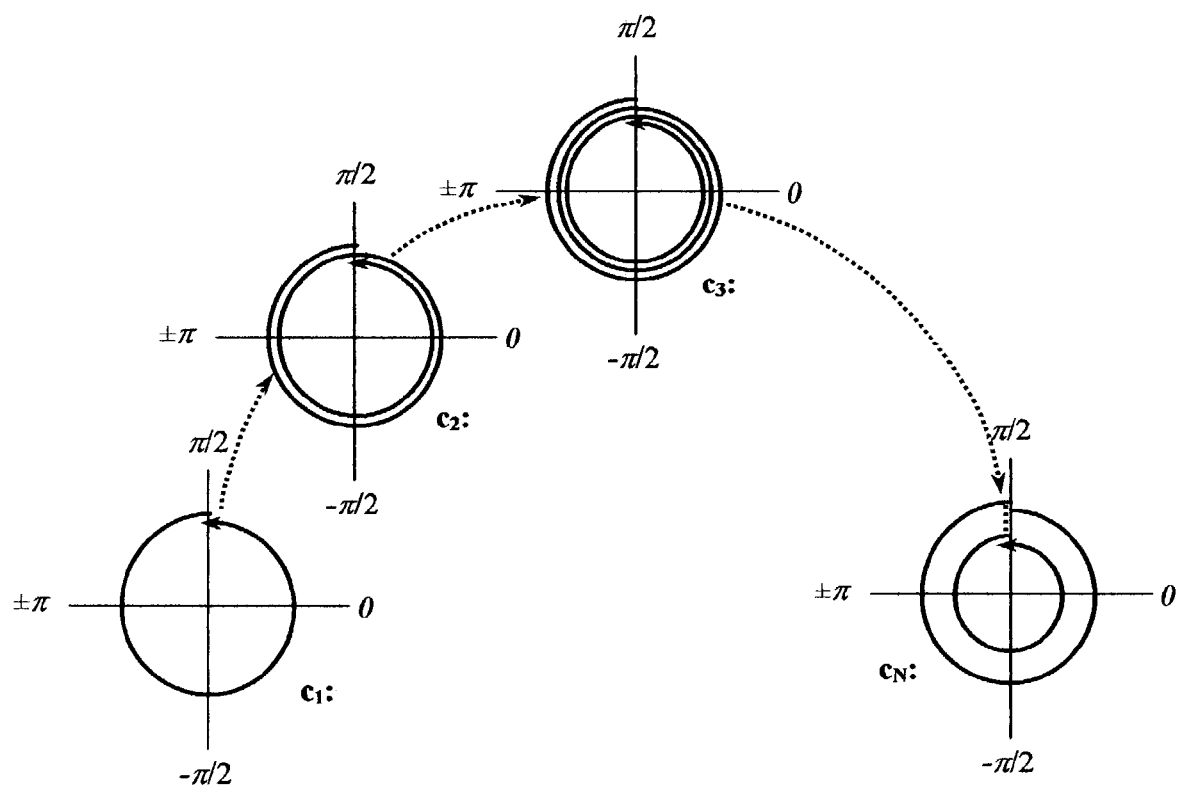
FIG. 4 illustrates CI code chips impressed onto orthogonal circular polarizations.

FIG. 4 illustrates a plurality of CI code chips $c_l$ to $c_n$ impressed onto orthogonal circular (or elliptical) polarizations. Each polarization has an integer number of rotations in a given symbol interval $T_s$ and thus, are orthogonal over the interval $T_s$. Other orthogonal polarizations may include opposite-direction rotations and/or $\pi/2$ phase offsets. Circular and elliptical polarizations can be processed as CI carrier frequencies. Orthogonal polarizations may be redundantly modulated via CI coding. CI phase spaces may be extended to polarization as well as other diversity parameters. Multiple data symbols may be modulated onto each polarization signal and provided with polarization-phase and/or signal phase relationships via CI coding to orthogonalize the interfering data symbols.

Figure 5:
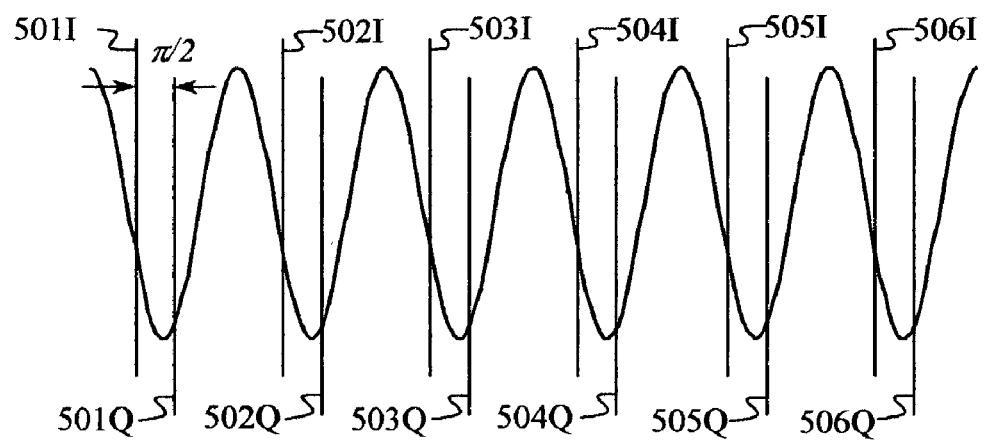
FIG. 5 illustrates in-phase and quadrature-phase sampling rates.

FIG. 5 illustrates two sets of samples 501I to 506I and 501Q to 506Q generated at similar sample rates, but with a $\pi/2$ phase offset between them. In-phase and quadrature-phase samples may be generated by providing a quarter wave phase offset to one of a pair of samples sets having similar sample rates. Both in-phase and quadrature-phase samples of a particular frequency produce the same vector sum of zero for orthogonal frequencies when samples collected over a corresponding time interval $T_s$ are combined.

Figure 6:
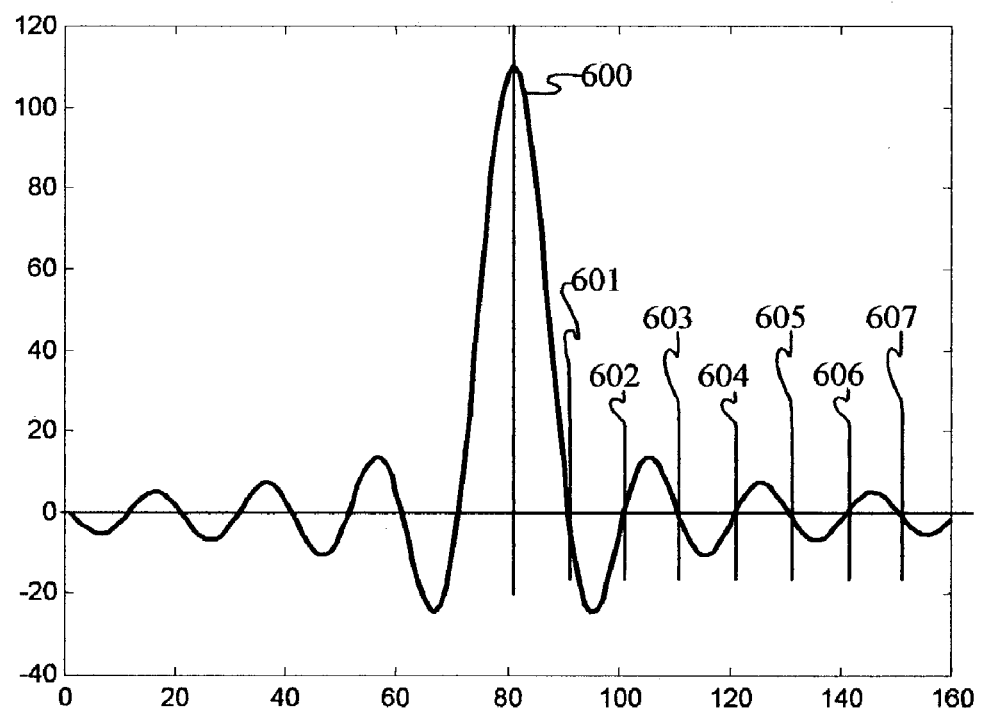
FIG. 6 illustrates a plot of sums of samples collected at a particular sample frequency for different sampled signal frequencies.

FIG. 6 illustrates the combined values of 110 CI samples for each of 400 frequencies in intervals of one cycle per symbol period $T_s$. Since the sampling rate is 110 samples per symbol period $T_s$, non-zero sums occur at 110 cycles-per-symbol intervals. All other integer cycles-per-symbol frequencies correspond to sample distributions around the complex plane that sum to zero.

A center peak 600 corresponds to a signal frequency that equals the sample frequency or is some sub-harmonic thereof. Similarly, peaks occur at 110 cycles-per-symbol intervals (not shown) from peak 600. Zero values, such as illustrated by zero-crossing 601 to 607, occur at integer cycles-per-symbol frequencies relative to the center frequency The zero crossings 601 to 607 indicate frequencies that are orthogonal to the center frequency.

In some applications, samples may be weighted prior to combining. Samples collected at different sample rates may be combined. Zero-crossing positions, as well as side-lobe height and main-lobe width, can be selected and/or adjusted by providing appropriate complex weights to the samples.

Figure 7A:
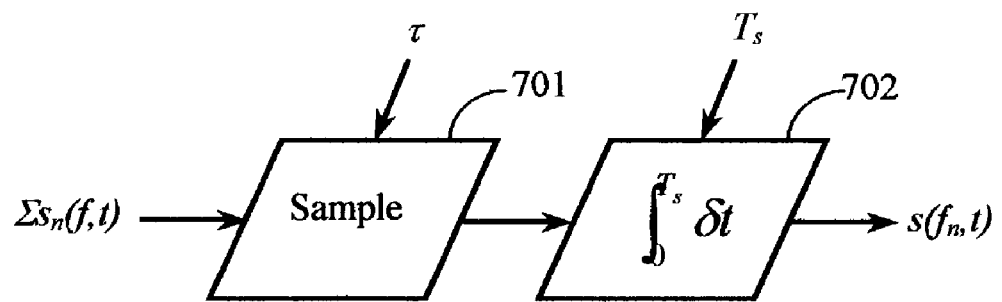
FIG. 7A is a functional diagram of a CI filtering apparatus and method of the invention.

FIG. 7A illustrates CI filtering as it applies to several apparatus and method embodiments of the present invention. An input signal $\Sigma s_n(f,t)$ includes multiple signal components having orthogonal frequencies. The input signal is processed in a sampler 701, which is a device or process that samples an input signal with respect to one or more diversity parameters. The sampler 701 uses at least one timing signal $\tau$ to select at least one sample rate. Samples from the sampler 701 are input to a combiner 702, which is adapted to sum or otherwise combine the samples. The combiner 702 includes a time base (not shown) that directs the combiner 702 to combine samples collected over at least one symbol interval $T_s$. An output signal $s(f_n,t)$ represents the combined samples output by the combiner 702.

The sampler 701 may generate one or more sets of samples with respect to one or more diversity parameter values (e.g., time intervals, carrier frequencies, etc.). In one embodiment, each set of samples corresponds to a different sampling rate. In another embodiment, a first set of samples is collected with respect to one sampling rate $f_{sample}$ and additional sample sets are generated as subsets of the first set. Thus, subset frequencies $f_{sample}(n)$ are less than the sampling rate $f_{sample}$. In at least one embodiment, the sampler 701 may sample the input signal at a sampling frequency $f_{sample}$ corresponding to one or more frequencies of the input signal. In at least one embodiment, the sampler 701 may under sample and/or over sample one or more signal components of the input signal. The sampler 701 may perform various types of sampling. Sample widths may be selected and/or adjusted with respect to received signal characteristics. Sample widths may be selected to equal a half period of at least one sampled waveform component.

The symbol interval $T_s$ is provided with respect to the relationship $T_s=1/f_s$ such that at least one data symbol on at least one carrier can be separated from interfering data symbols on one or more carriers that are orthogonal to the desired carrier(s). The process of summing the selected samples over the symbol interval $T_s$ cancels samples of orthogonal carriers that are not aliased. The input signal $\Sigma s_n(f,t)$ may be filtered by a passband and/or anti-aliasing filter (not shown) coupled to the sampler. In some applications, CI filtering may decompose a single-carrier signal into a plurality of CI carriers or CI signal values. In other applications, a received multicarrier signal may be decomposed into carrier signals or CI signal values.

The sampler 701 and/or combiner 702 may include a storage device or accumulator (not shown) to store samples before combining them. The combiner 702 may combine one or more subsets of samples and/or combine all of the samples together. The sampler 701 may include a frequency converter (not shown) to up convert and/or down convert the received signal(s). The sampler 701 and/or the combiner 702 may include a weighting device (not shown) to apply weights to the samples and/or sums of the samples. In some embodiments, weight values may be applied by selecting, shifting, or otherwise adjusting the sample order. Weights may compensate for channel effects and/or signal coding. An optimal-combining process may control the weights to enhance reception of desired signals in the presence of noise and/or interference. In one application, a weighting device may provide complex weights to the CI symbols to facilitate selection of one or more data symbols.

The combination of sampling and combining can demodulate data symbols impressed on one or more frequencies without complex digital processing. FIG. 7A illustrates one type of coherent CI filtering that is useful for separating data symbols impressed on multiple orthogonal frequency channels. Variations to this method and apparatus may be employed. Typically, a CI filtering system will include a synchronizer (not shown) adapted to adjust either or both the sample rate(s) and the symbol interval(s) $T_s$ to compensate for phase offsets and/or phase jitter. A CI filtering system may include a phase-lock loop (not shown).

Figure 7B:
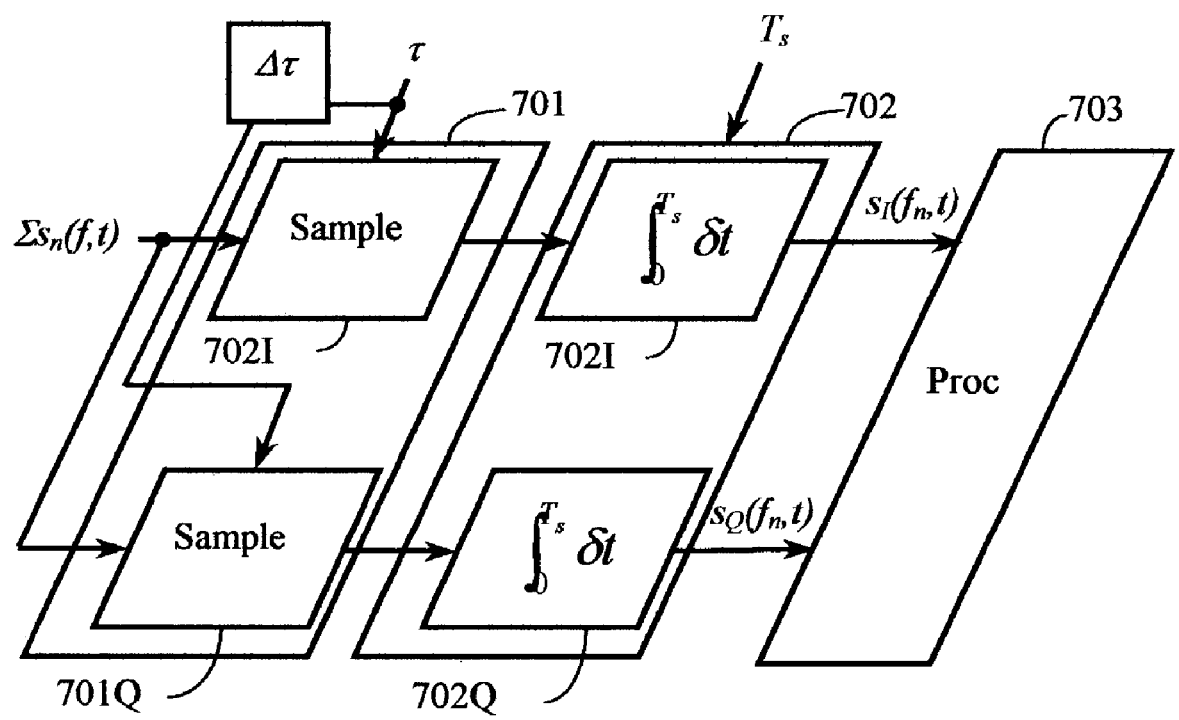
FIG. 7B illustrates in-phase and quadrature-phase CI filtering.

FIG. 7B illustrates a CI filtering apparatus that performs in-phase and quadrature-phase processing. An input signal $\Sigma s_n(f,t)$ is processed by a sampler 701 that includes in-phase and quadrature sampling units 701I and 701Q, respectively. The samples are combined in a combiner 702 that includes in-phase and quadrature-phase combining units 702I and 702Q. The combiner 702 outputs in-phase and quadrature signals $s_I(f_n,t)$ and $s_Q(f_n,t)$ that may optionally be processed in at least one signal processor 703. The signal processor 703 may include one or more systems including a channel decoder, a demodulator, a trellis decoder, an encryption decoder, a filter, a correlator, a multi-user detector, a decision system, a deinterleaver, a multi-user detector, a combiner, and an A/D converter.

The Fourier transform of a time-domain signal is expressed by:

$$X(f) = \int_{-\infty}^{\infty} x(t) e^{i2\pi f t} \delta t.$$

The corresponding discreet Fourier transform (DFT) equation is expressed by:

$$X(f_n) = \sum_{k=0}^{K-1} x_k e^{-i2\pi f_n k t_o}$$

where K is the number of time-domain samples collected over a period of $T_s = K t_o$. Several simplifications can be made for cases in which orthogonal frequencies are used. The orthogonal frequencies $f_n$ are expressed by:

$$f_n = f_o + n f_s$$

and the sampling period is $T_s = 1/f_s$.

When orthogonal frequencies are sampled and processed by a DFT, a value in a particular frequency bin $f_n$ corresponds to time-domain samples $x_k$ multiplied by complex values $e^{i2\pi f_n k t_o}$. Since multiplication with a complex value is relatively computationally complex, it is desirable to replace complex multiplications with simpler operations, such as adding and shifting. This is accomplished by replacing the complex value $e^{i2\pi f_n k t_o}$ with a simpler function, such as at least one periodic step function $\Gamma(t,f_n,\phi)$ having at least one frequency $f_n$. For example, a periodic binary step function is expressed by:

$$\Gamma(t, f_n, \phi) = \begin{cases} -1 (\cos(2\pi f_n t + \phi) < 0) \\ +1 (\cos(2\pi f_n t + \phi) > 0) \end{cases}$$

Other types of step functions may be used, such as step functions having more than two levels. Step-function levels may be uniformly or non-uniformly spaced. Step functions may have multiple phases $\phi$. For example, in-phase and quadrature-phase step functions may be employed for each frequency $f_n$.

The step function $\Gamma(t,f_n,\phi)$ can be expressed as a sum of harmonic sinusoids:

$$\Gamma(t, f_n, \phi) = \sum_{n=1,3,5,\ldots} \frac{\sin(2\pi f_n t + \phi_n)}{n}.$$

Figure 8A:
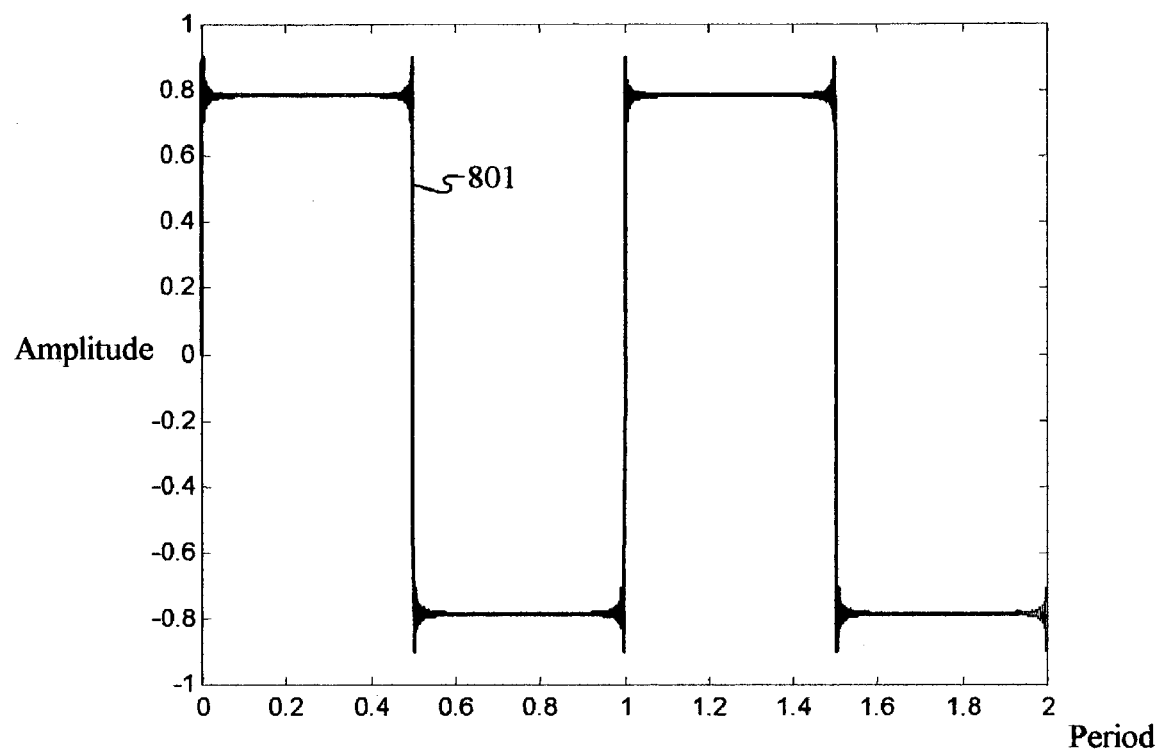
FIG. 8A shows two periods of a step function constructed from a superposition of odd-numbered sinusoids.
Figure 8B:
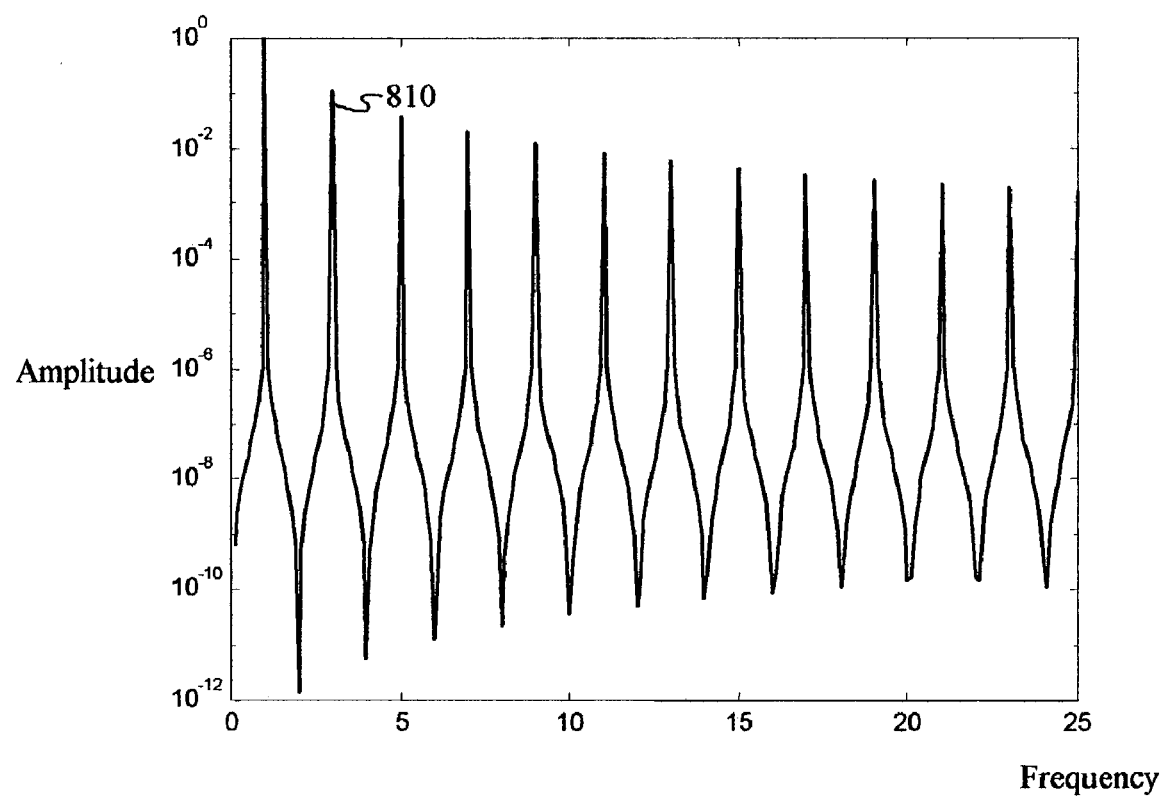
FIG. 8B illustrates a portion of a Fourier transform of the step function shown in FIG. 8A.

FIG. 8A illustrates two periods of a step function 801 constructed from a superposition of 100 odd-numbered sinusoids generated with respect to the step function $\Gamma(t,f_n,\phi)$. FIG. 8B illustrates a portion of a Fourier transform 810 of the step function 801. The Fourier transform 810 shows 13 of the 100 component frequencies and their relative magnitudes.

The step functions $\Gamma(t,f_n,\phi)$ are used in place of the periodic complex values $e^{i2\pi f_n k t_o}$ to simplify the DFT of a signal having an orthogonal set of frequency components. This improvement is suggested by the DFT equation, which shows that the complex multipliers $e^{i2\pi f_n k t_o}$ corresponding to frequency bin $f_n$ are periodic with respect to $f_n$.

In one set of preferred embodiments, the sampled signal is band-limited such that only the frequency component $f_n$ of the step function $\Gamma(t,f_n,\phi)$ contributes to values of $X(f_n)$ in the orthogonal-frequency Fourier transform (OFFT) equation:

$$X(f_n) = \sum_{k=0}^{K-1} x_k \Gamma(t, f_n, \phi)$$

The OFFT equation is similar to the DFT equation in its ability to quantify frequency bin values. The OFFT is simpler than other Fourier transform techniques because it replaces the complex values $e^{i2\pi f_n k t_o}$ with simple step-function values that can be implemented in an adding process. Thus, the OFFT replaces complex multiplications with additions.

In the orthogonal-frequency case, the continuous form of the OFFT is the CI Orthogonal-Frequency Fourier Integral, or CIOFFI:

$$X(f_n) = \int_0^{1/f_s} \cos(2\pi f_{n'} t + \phi_{n'}) \Gamma(t, f_n, \phi)$$

where the cosine term represents at least one of the received carriers having frequency $f_{n'}$. Assuming equality between all phase $\phi_{n'}$ and $\phi$ values, the continuous-form OFFT can be expanded as:

$$X(f_n) = \frac{1}{2\pi f_{n'}} \left[ \sin 2\pi f_{n'} t \Big|_0^{\frac{1}{4f_n}} - \sin 2\pi f_{n'} t \Big|_{\frac{1}{4f_n}}^{\frac{3}{4f_n}} + \ldots + \sin 2\pi f_{n'} t \Big|_{\frac{1}{4f_n} + \frac{2n-1}{2f_n}}^{0} \right]$$

and simplified to:

$$X(f_n) = \frac{1}{2\pi f_{n'}} \sum_{k=0}^{K-1} (-1)^k \sin \frac{2\pi n' y}{n} \Big|_{\frac{-1}{4} + \frac{k}{2}}^{\frac{1}{4} + \frac{k}{2}}$$

where y is a dimensionless variable. Further simplification yields:

$$X(f_n) = \frac{1}{\pi f_{n'}} \sin \frac{\pi n'}{2n} \sum_{k=0}^{K-1} (-1)^k \cos\left(\frac{\pi n' k}{n} + \phi_m\right)$$

The phase term $\phi_m$ indicates the possibility of a phase-modulated information signal or a phase-space channel.

When the OFFT sample frequency $f_n$ equals the received carrier frequency $f_{n'}$ (i.e., n=n'), the OFFT equation reduces to:

$$X_{n=n'}(f_n) = \frac{1}{\pi f_n} \sum_{k=0}^{K-1} (-1)^k \cos(\pi k + \phi_m)$$

For each value of k, the $\pi$ rotation of the vector represented by the cosine term is flipped by the −1 term. Thus, each $k^{th}$ vector maps onto a vector direction defined by the phase term $\phi_m$. Consequently, the terms of the OFFT that correspond to n=n' combine constructively.

When the OFFT sample frequency $f_n$ does not equal the received carrier frequency $f_{n'}$ (e.g., n≠n'), the OFFT equation is written as:

$$X_{n \neq n'}(f_n) = \frac{1}{\pi f_n} \sin \frac{\pi n'}{2n} \sum_{k=0}^{K-1} (-1)^k \cos\left(\frac{\pi n' k}{n} + \phi_m\right)$$

For simplicity, it may be assumed that the number of samples K collected is approximately some integer multiple of the number of sampled cycles per symbol interval. The approximation works well for large numbers of samples. Similarly, K can simply be set to some integer multiple of the sampling frequency $f_n$. Each value of $X_{n \neq n'}(f_n)$ is a constant-valued vector having an incremental angular offset of $\pi n/n'$. After an integer number of full rotations, the sum of the K vectors is substantially zero. Thus, the terms of the OFFT that correspond to n≠n' (where n and n' are not harmonically related) combine destructively.

Figure 9A:
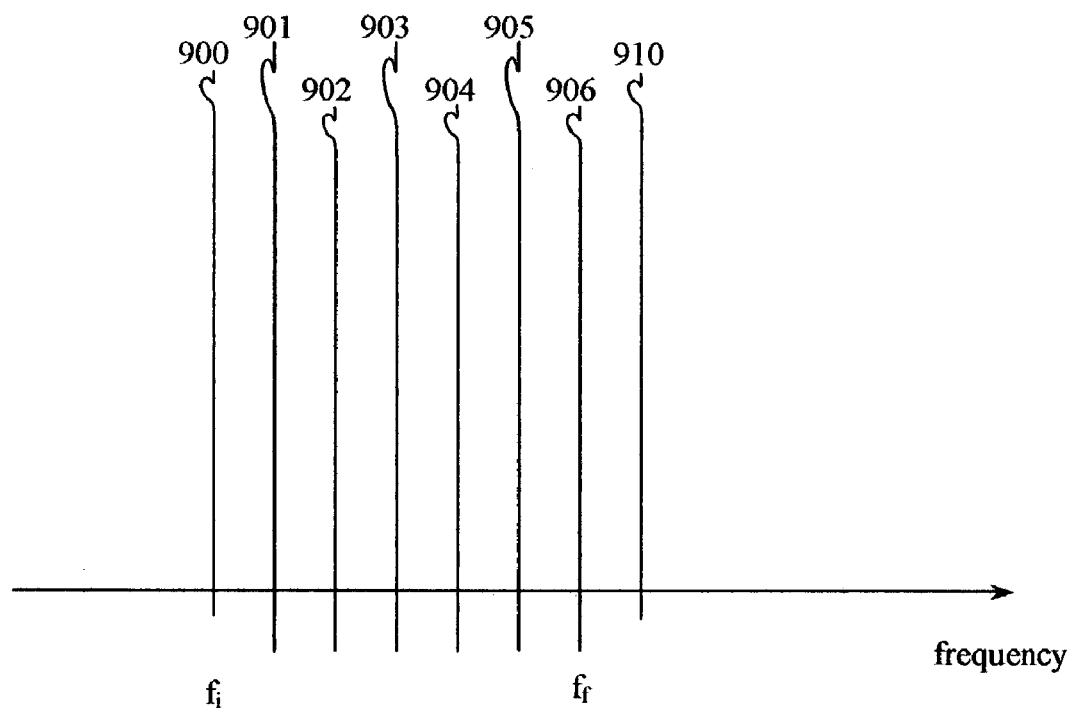
FIG. 9A shows a first frequency component of a sampling step function that equals a desired carrier frequency $f_i$. A plurality of orthogonal carrier frequencies $f_i$ to $f_f$ represents a bandwidth limit of a received signal that avoids aliasing

FIG. 9A is a frequency-domain representation of a band-limited set of received orthogonal frequency components 900 to 910. A step function used in an OFFT or CI filtering process includes a component equal to frequency 900. If the received frequency 910 is a harmonic of a step-function component (e.g., frequency 900), it may contribute interference to symbol values processed from frequency 900. Thus, in some applications, it is preferable to provide for band limiting of a received signal such that only one frequency component of the applied step function has a non-zero OFFT or CI-filtering result. Alternatively, the step function may be adapted to a given received signal's frequency band.

Figure 9B:
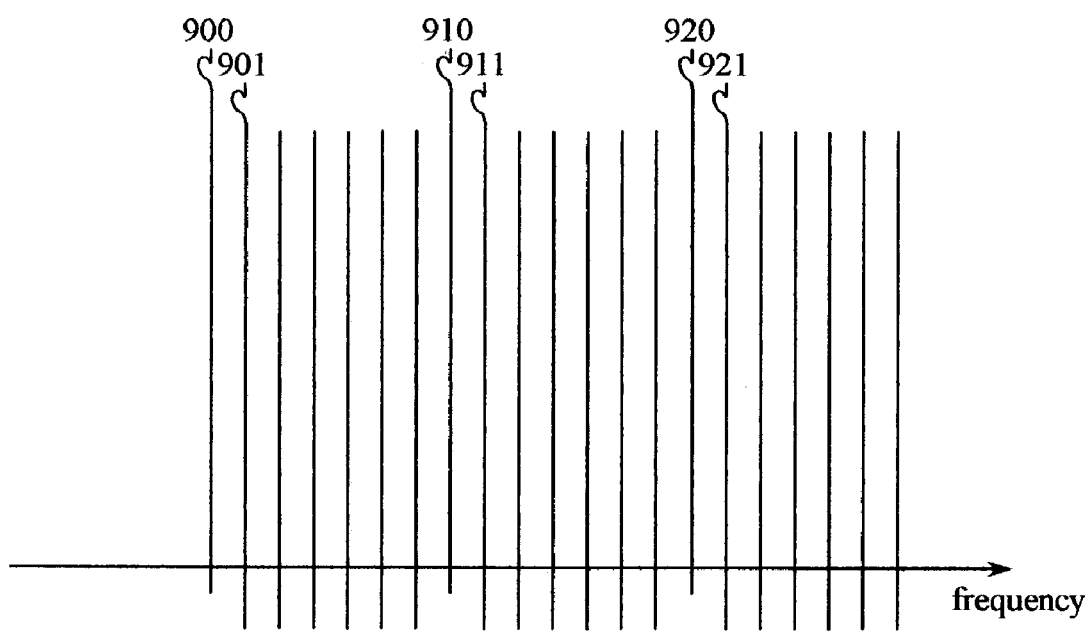
FIG. 9B shows a first set of uniformly spaced carrier frequencies equal to components of a first step function. A second set of carriers is orthogonal to the first set.

FIG. 9B illustrates a received signal's frequency distribution for an alternate OFFT or CI filtering embodiment. Data symbols are redundantly modulated onto at least a first set of uniformly spaced carrier frequencies, such as frequencies 900, 910, and 920. CI filtering or an OFFT are provided with respect to one or more step functions that include frequencies 900, 910, and 920. Data symbols recovered from the first frequency set are orthogonal to symbols on an adjacent set, such as frequencies 901, 911, and 921.

In-phase and quadrature-phase step functions may be used in functions that measure complex values for each of a plurality of frequency bins:

$$\text{Re}(y_p) = \sum_{k=0}^{K-1} x_k \Gamma[\tau_n = 1/f_n, \phi = 0]$$

$$\text{Im}(y_p) = \sum_{k=0}^{K-1} x_k \Gamma[\tau_n = 1/f_n, \phi = \pi/2]$$

In order to sample CI waves at a particular phase space $\phi_m$, a set of step functions corresponding to each of the carriers for that particular phase space are used:

$$C_m = y_p(\phi_m) = \sum_{n=1}^{N} \sum_{k=0}^{K-1} x_k \Gamma[\tau_n = 1/f_n, \phi = \phi_m]$$

The values obtained for each frequency bin may be multiplied by one or more complex weights $w_n$ prior to combining in order to compensate for fading and interference:

$$C_m = y_p(\phi_m) = \sum_{n=1}^{N} w_n \sum_{k=0}^{K-1} x_k \Gamma[\tau_n = 1/f_n, \phi = \phi_m]$$

Figure 10:
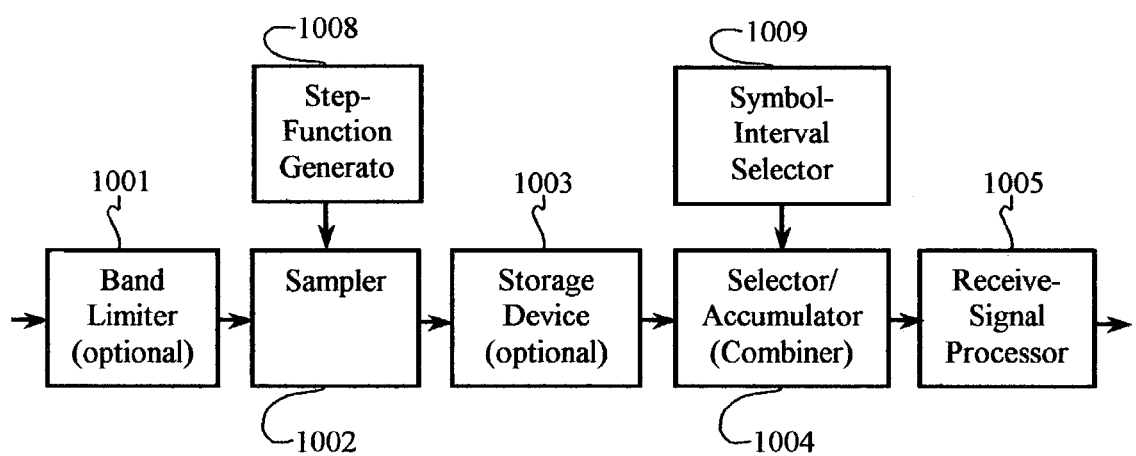
FIG. 10 illustrates basic components of a CI-OFFT receiver.

FIG. 10 illustrates basic components of a CI-OFFT receiver. A received signal is optionally processed by a band limiter, such as a filter 1001. The band limiter 1001 may act as an anti-aliasing filter and/or channel selector. Received signals are processed by a sampler 1002 that generates one or more sample sets with respect to at least one step-function provided by a step-function generator 1008. The step-function generator 1008 may control one or more sampling parameters of the sampler 1002, such as sample width, sample rate, sample shape, number of samples, sample sets, etc. The sampler may adjust the sample parameters to provide filtering.

Samples generated by the sampler 1002 may optionally be stored in a storage device 1003, such as a computer memory. A combiner (e.g., a selector/accumulator) 1004 selects and groups samples for combining. A symbol-interval selector 1009 may control selection criteria, such as symbol duration $T_s$ and number of samples per symbol interval. The symbol duration $T_s$ corresponds to a particular number of step-function periods over which samples are combined. In an OFFT process, the combination of symbol durations and step-function periods are adapted to decompose a received signal into orthogonal components. The components may optionally be coupled to a processor 1005 adapted to perform one or more receiver processes, such as combining, multi-user detection, decision, error detection, error correction, channel estimation, channel compensation, decoding, etc.

In an alternative embodiment of the invention, the sampler 1002 is adapted to provide unformatted samples to the selector/accumulator 1004. The selector/accumulator 1004 is adapted to generate one or more sample sets with respect to step-function parameters provided by the step-function generator 1008. In this case, the selector/accumulator 1004 may control symbol duration $T_s$ (i.e., carrier separation $f_s$) and step-function frequency (i.e., carrier selection or total bandwidth). The selector/accumulator 1004 may optionally provide weights to the samples (such as to adapt to step-function levels, compensate for channel effects, mitigate interference, perform demodulation, and/or provide for any other signal-processing objectives). The selector/accumulator 1004 may optionally discard or replace sample values that exceed and/or fail to meet predetermined threshold power levels.

The principles of the OFFT may be applied to any algorithmic or numerical Fourier transforms, such as FFTs and IFFTs. In an inverse CI-OFFT process, data symbols are impressed onto one or more carrier signals by combining time-domain symbols relative to a function (e.g., a step function) representing a sum of a plurality orthogonal basis functions (e.g., sinusoidal waves). Certain processing benefits are achieved when the sum of basis functions is simpler to process than the individual components. The orthogonal basis values may include only one of the carriers in the multicarrier signal. Alternatively, the orthogonal basis may include more than one carrier in the multicarrier signal.

In one embodiment of the invention, data symbols are impressed onto a multicarrier signal by combining one or more information symbols relative to at least one step function. The period of each step function may correspond to a multicarrier frequency. Alternatively, the multicarrier frequencies include one or more step function harmonics.

Figure 11:
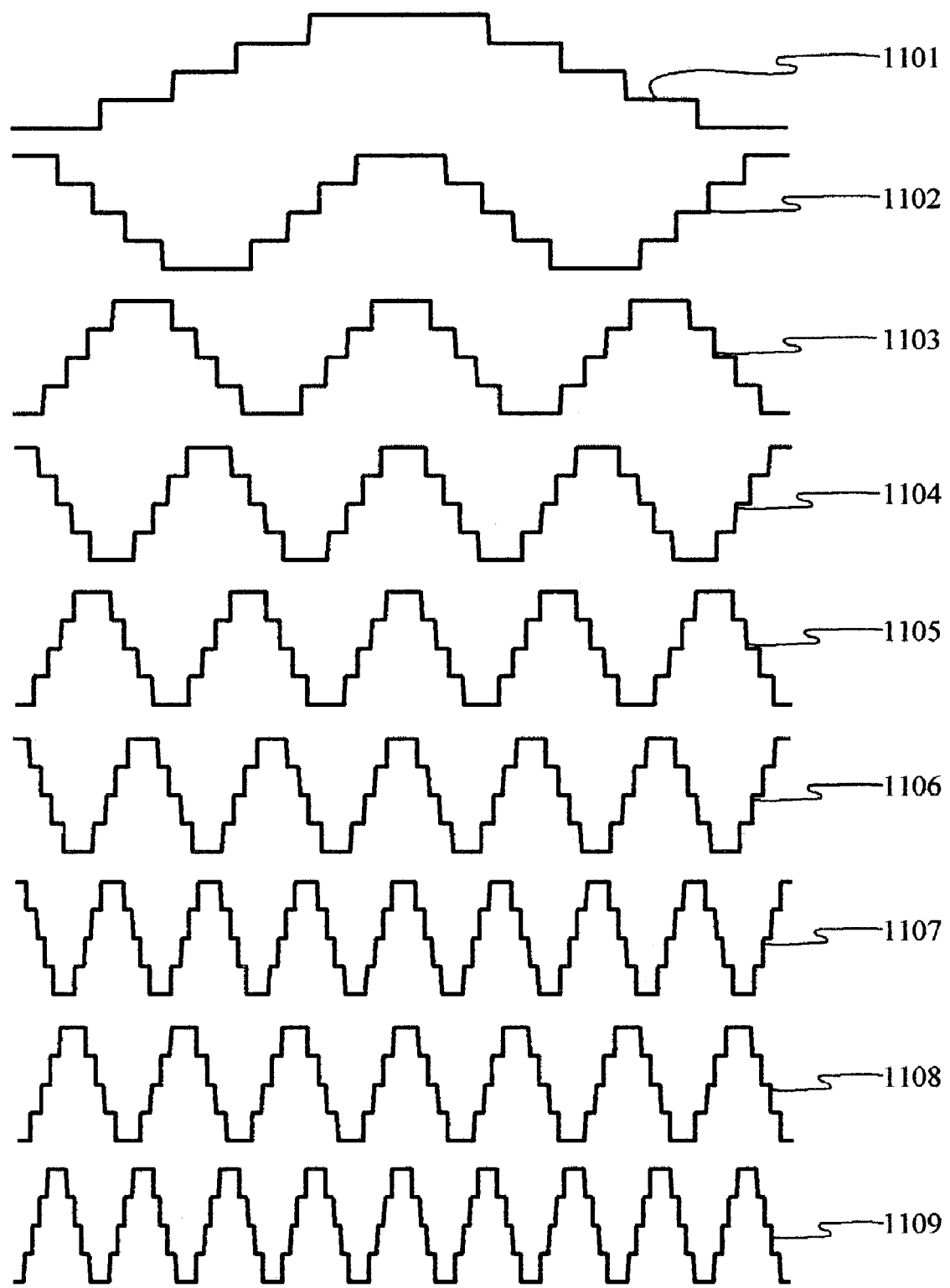
FIG. 11 illustrates a plurality of five-level step functions having orthogonal frequencies.
Figure 12A:
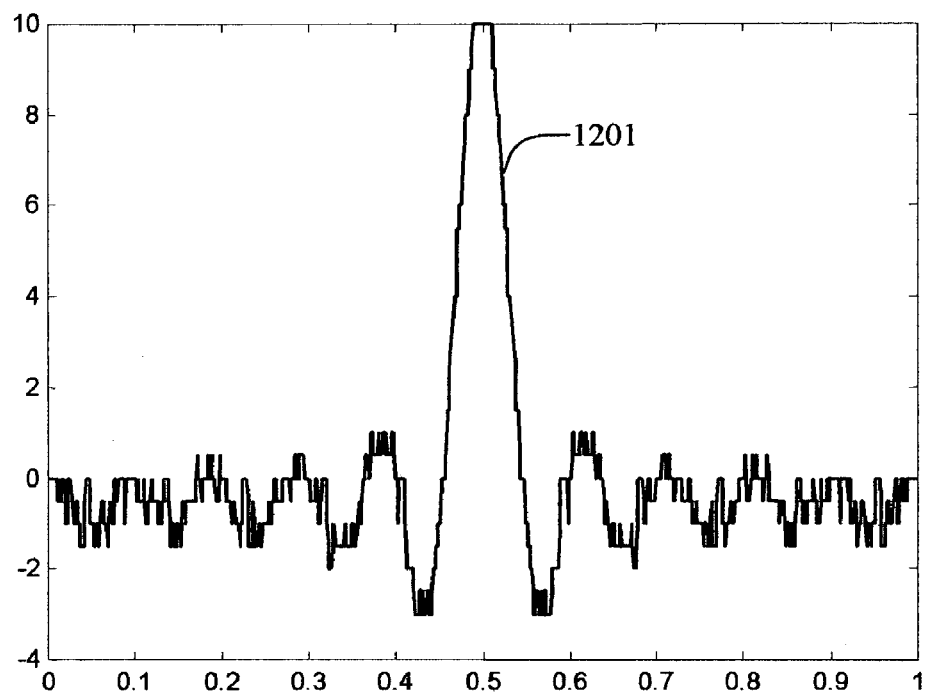
FIG. 12A shows a pulse resulting from a superposition of step functions shown in FIG. 11.
Figure 12B:
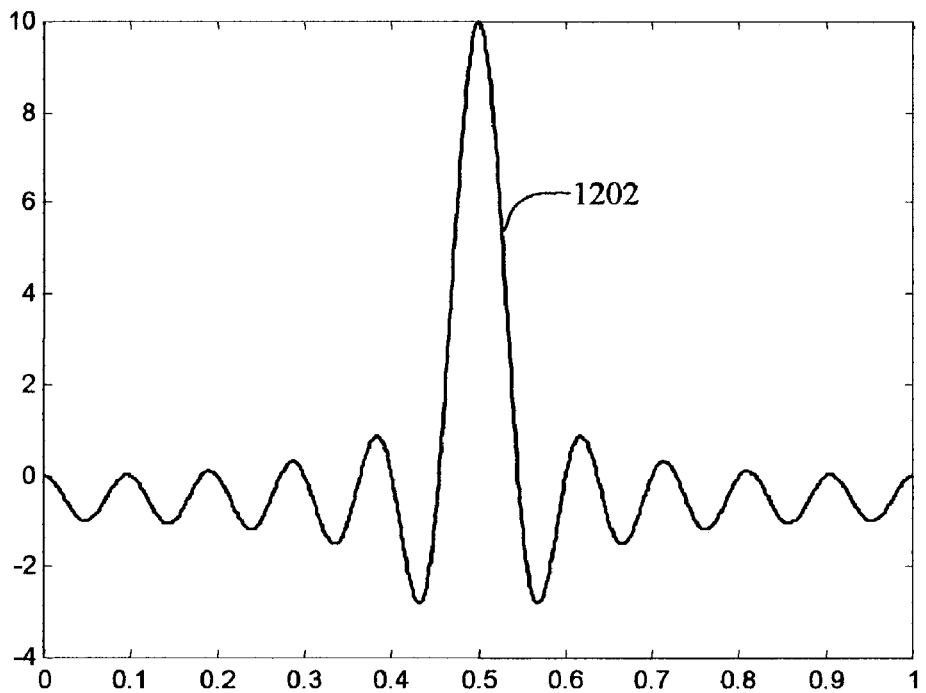
FIG. 12B illustrates a filtered superposition pulse resulting from low-pass filtering the pulse shown in FIG. 12A.

FIG. 11 illustrates a plurality of five-level step functions 1101 to 1109 that are orthogonal over the interval shown. FIG. 12A illustrates a pulse 1201 resulting from a superposition of the step functions 1101 to 1109. High-frequency components of the superposition signal 1201 may be filtered using a low-pass filter (not shown) to produce a filtered baseband signal 1202 illustrated in FIG. 12B.

Step functions may be modulated with at least one information signal to produce an information-modulated pulse. In one application, each step function is modulated (or otherwise impressed) with at least one information signal. The step functions may be modulated via CI coding. In one example, the step-function carriers are provided with a plurality of interfering information signals and the carriers are combined to produce a plurality of superposition pulses that characterize each of the information signals. In some applications, the carriers may be provided with phase offsets (for example, to enhance security and/or reduce PAPR) prior to combining. Low-frequency and/or high-frequency components of the combined signals may be selected and/or removed via filtering. High-frequency components may be selected to provide for frequency up-conversion.

Figure 13A:
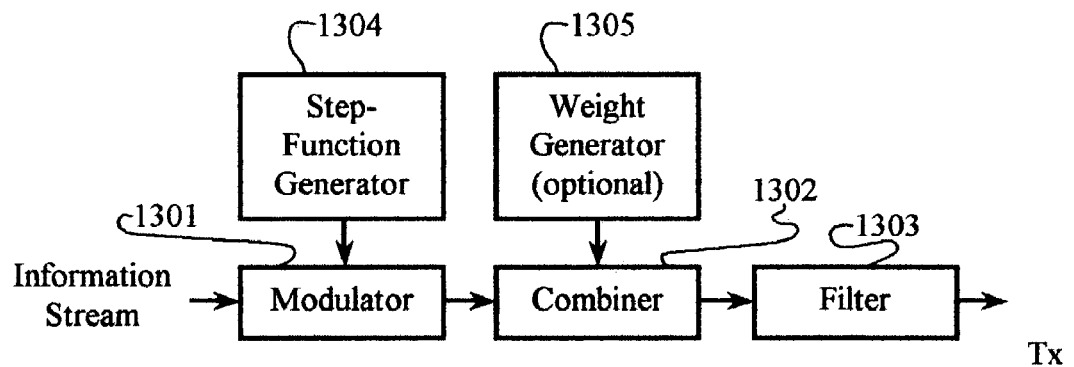
FIG. 13A illustrates a functional embodiment of an inverse CI-OFFT system of the invention.

FIG. 13A illustrates an inverse CI-OFFT system. Information symbols from an input information stream are modulated by a modulator 1301 onto a plurality of step functions generated by a step-function generator 1304. The step functions may optionally be weighted by a weight generator 1305 prior to being combined in a combiner 1302. The step functions may be weighted to compensate for channel distortion, generate array-processing weights, provide coding (such as channel coding, crest-factor reduction, and/or a direct-sequence type of coding), or perform any other physical-layer processing. The combined signal may be filtered to band limit and/or frequency up-convert the signal. The filtered signal may be provided to a transmission system for coupling into a communication channel.

Figure 13B:
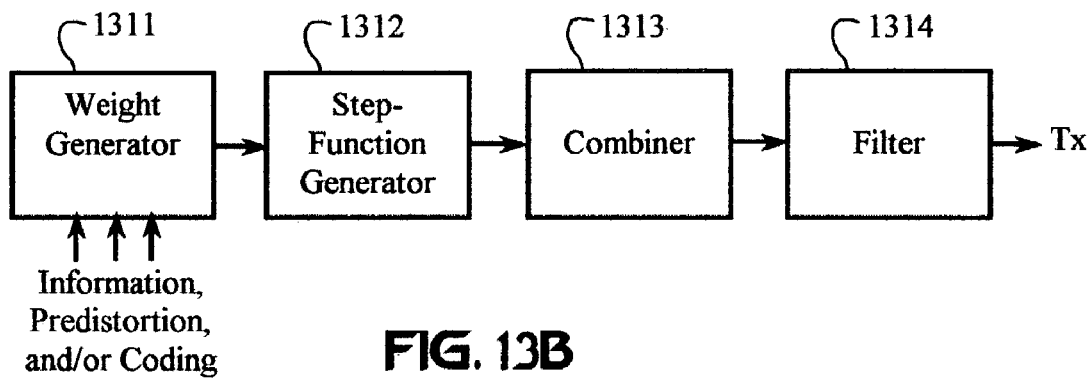
FIG. 13B illustrates an alternative functional embodiment of an inverse CI-OFFT system.

FIG. 13B illustrates an alternative functional embodiment of an inverse CI-OFFT system. A weight generator 1311 is adapted to provide weights to a step-function generator 1312. The weights characterize at least one information signal. Optionally, the weights may be adapted to other physical-layer parameters, such as coding, channel compensation, and/or array-processing weights. The weighted step functions are combined in a combiner 1313 and filtered by a filter 1314 prior to being coupled to a transmission system (not shown).

Figure 13C:
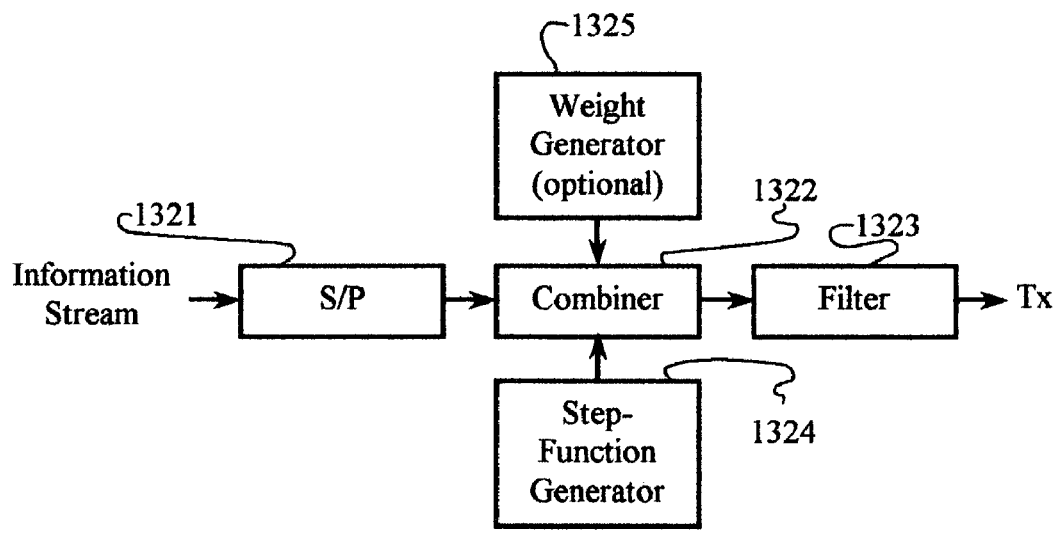
FIG. 13C illustrates yet another functional embodiment of an inverse CI-OFFT system.

FIG. 13C illustrates yet another embodiment of a functional embodiment of an inverse CI-OFFT system. A serial-to-parallel converter 1321 processes an information sequence. The information symbols are combined in a combiner 1322 with respect to a plurality of orthogonal basis functions, such as provided by a step-function generator 1324. Optionally, the information symbols may be weighted and/or combined with respect to weights provided by a weight generator 1325. The combined signals are processed by a filter 1323 prior to being coupled to a transmission system (not shown).

The methods and systems illustrated with respect to OFFT techniques (including the inverse CI-OFFT) may be provided in many different ways. Methods and systems of the invention are provided to facilitate an understanding of the underlying principles of CI-based processing. Variations of these embodiments, as well as the incorporation of CI-based processing methods and systems into communication, remote sensing, and analytical instruments is clearly anticipated.

Figure 14A:
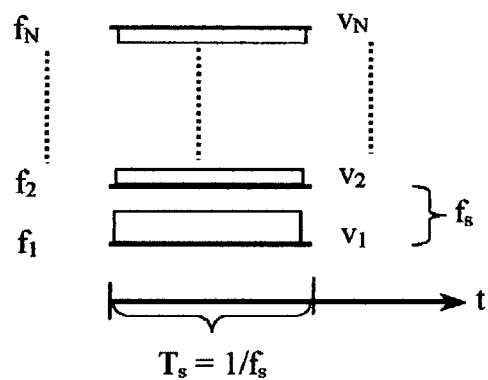
FIG. 14A shows a decomposition of a single-carrier signal into N frequency components.
Figure 14B:
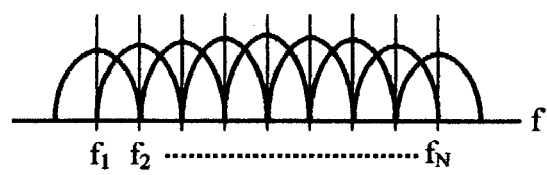
FIG. 14B shows a frequency-domain plot of the signal shown in FIG. 14A.

A preferred embodiment of the invention provides for decomposing a single-carrier signal into a plurality of component values representing overlapping narrowband carrier signals. FIG. 14A illustrates N modulated orthogonal carrier components. When a signal is decomposed into carrier components, each carrier frequency $f_n$ is associated with a complex-valued symbol $v_n$. A sample period of $T_s=1/f_s$ provides overlapping frequencies $f_n$ (shown in FIG. 14B) that have an incremental frequency separation of $f_s$.

The sample period $T_s$ is a predetermined time interval in which samples are collected and processed. Fourier transforms or equivalent operations may be performed. The period $T_s$ specifies a set of orthogonal frequencies $f_n$. Samples collected within each sample period $T_s$ may be selected and/or weighted to adjust a receiver's sensitivity to particular frequencies.

Figure 14C:
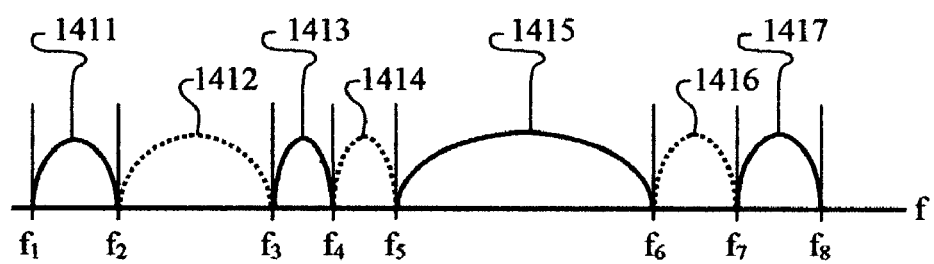
FIG. 14C illustrates a spectral profile selected for transmission or reception in a particular communication channel. Frequency ranges characterized by interference, fading, and/or frequency allocations to other systems, applications, and/or users are avoided.

FIG. 14C illustrates a desired spectral profile for a particular communication channel. Information signals are transmitted and/or received in a plurality of spectral ranges 1411, 1413, 1415, and 1417. It is desirable to avoid certain spectral ranges, such as a spectral range 1412 allocated to another user, application, or system, a spectral range experiencing a deep fade 1414, and a spectral range 1416 experiencing interference. CI processing techniques provide for avoiding transmission and/or reception in non-desirable spectral ranges. Desirable spectral ranges, even non-contiguous spectral profiles, can support CI carriers that combine in a CI receiver to produce a conventional single-carrier signal.

Figure 15C:
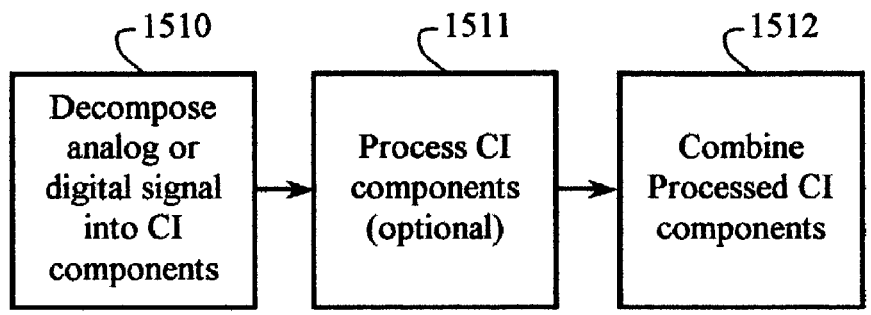
FIG. 15C illustrates basic steps of a CI reception method.
Figure 15A:
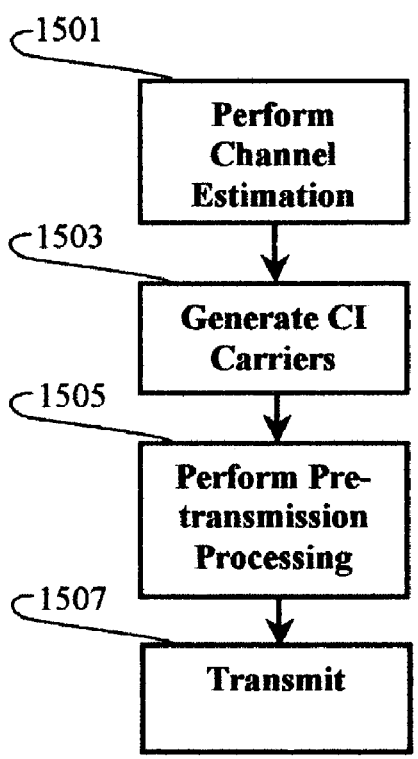
FIG. 15A illustrates a method of generating CI carriers as part of a transmission process.

FIG. 15A illustrates a method of generating CI carriers as part of a transmission process. A channel-estimation step

1501 characterizes the communication channel and identifies desirable and/or undesirable spectral regions. Channel estimation 1501 may include any combination of blind adaptive and training methods. Channel estimation 1501 may be performed by either or both local and remote transceivers.

CI carriers are generated in a CI carrier generation step 1505 based on channel estimates. Pre-transmission processing 1506 is performed prior to transmitting 1507 the carriers into a communication channel. Pre-transmission processing 1506 may include typical transmit-side processing, such as predistortion, A/D conversion, modulation, multiplexing, multiple-access processing, up conversion, amplification, filtering, coding, beam forming, etc.

Figure 15B:
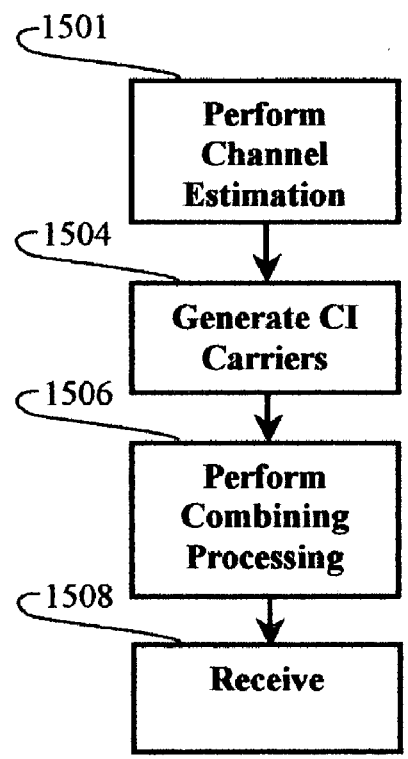
FIG. 15B illustrates a method of generating CI carriers as part of a receiving process.

FIG. 15B illustrates a method of generating CI carriers as part of a receiving process. A channel-estimation step 1501 characterizes the communication channel and identifies desirable and/or undesirable spectral regions. A received signal is decomposed 1504 into a plurality of CI carriers. Carrier properties, such as frequency selection, frequency spacing, and complex weighting are selected, at least in part, with respect to the channel estimates. Optionally, the carriers may be processed before being combined in a combining process 1506. The combining process 1506 may be directed by channel estimates. Combining 1506 may be performed using any appropriate optimal-combining technique, such as MMSE combining. Alternatively, other combining techniques may be used. The combined signals are then conveyed to a receiving process 1508 that may further process the combined signals.

Decomposition of a received signal into narrowband CI components permits low-speed, parallel processing. In addition to simplifying demodulation of a high-rate signal, CI carrier processing can simplify many data-processing applications (such as error detection/correction, verification, and decoding) that typically require high-rate processing. Similar benefits can be provided to other signal-processing operations, such as interference mitigation, noise mitigation, correlation, matched filtering, beam forming, etc.

FIG. 15C illustrates a CI reception method. A received single-carrier signal is decomposed into CI components in a decomposition step 1510. The received signal may be an analog or a digital signal. An analog signal is may be decomposed into a multicarrier analog signal or a plurality of complex values representing carrier weights. A digital signal may be decomposed into a plurality of analog carriers whose superposition represents time-domain characteristics of the digital signal. A digital signal may be expressed by a plurality of complex weights corresponding to the analog carriers. The decomposed signal components may be processed in an optional processing step 1511 prior to combining 1512. Various processing and combining steps may be performed, as described throughout the specification.

Figure 16A:
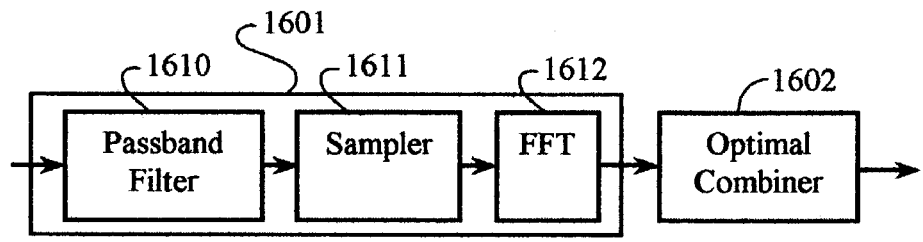
FIG. 16A illustrates a CI receiver adapted to process single-carrier signals.

FIG. 16A illustrates a CI receiver adapted to process single-carrier signals. A single-carrier signal may include a single carrier signal modulated with an information signal, an unmodulated carrier, or any received multicarrier signal that can be processed as a single-carrier signal. An orthogonal-frequency filter 1601 is coupled to an optimal combiner 1602. Additional signal-processing units, such as one or more decoders, formatters, beam formers, demodulators, demultiplexers, despreaders, channel compensators, etc., may be coupled to the combiner 1602. The orthogonal-frequency filter 1601 may include an optional band-limiting filter 1610, a sampler 1611, and a digital filter 1612, such as a Fourier transform processor or CI filter. The sampler 1611 may be integrated into a filter, such as the digital filter 1612.

The orthogonal-frequency filter 1601 decomposes at least one input single-carrier and/or multicarrier signal into a plurality of orthogonal components. The CI receiver may include a front-end processor (not shown) to process a received signal prior to decomposition by the orthogonal-frequency filter 1601. The combiner 1602 may perform array processing, interference mitigation, despreading, demultiplexing, channel compensation, multiple-access processing, A/D processing, D/A processing, as well as combining.

The digital filter 1612 may include one or more filters to process samples produced by the sampler 1611. The filter 1612 may include a filter bank. The filter 1612 may include any type of signal processor adapted to perform a Fourier transform operation. For example, the filter 1612 may perform one or more FFTs, DFTs, and/or OFFTs. The filter 1612 may include one or more filters with simple delays and/or sophisticated filters having complex amplitude and phase responses.

Figure 16B:
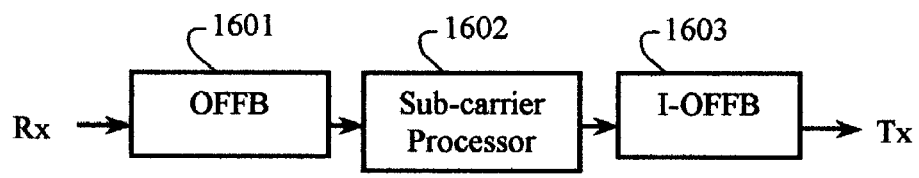
FIG. 16B illustrates a repeater that converts a received signal into overlapping, orthogonal CI components, processes the components, and recombines the processed components prior to transmitting the combined components. The repeater includes an orthogonal-frequency filter bank, a sub-carrier processor, and an inverse orthogonal-frequency filter bank.

FIG. 16B illustrates a repeater that converts a received signal into overlapping, orthogonal CI components, processes the components, and recombines the processed components prior to transmitting the combined components. The repeater includes an orthogonal-frequency filter bank (OFFB) 1601, a sub-carrier processor 1602, and an inverse orthogonal-frequency filter bank (IOFFB) 1603.

Figure 16C:
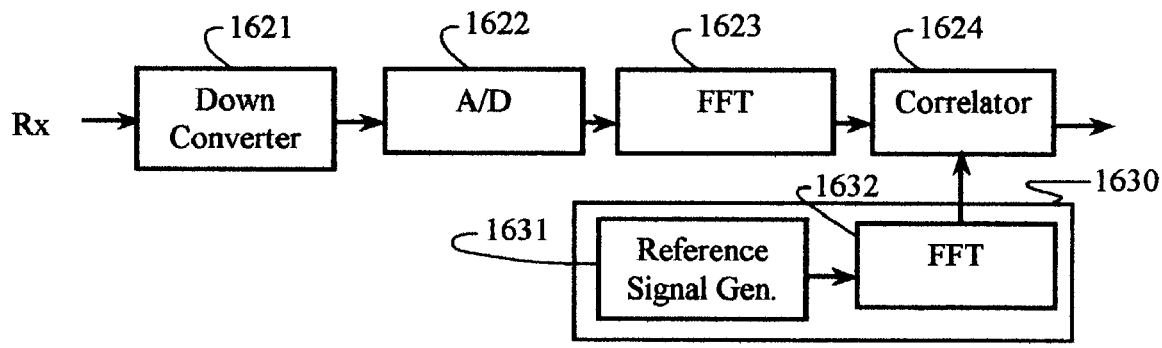
FIG. 16C illustrates a matched-filter CI receiver adapted to process single-carrier signals.

FIG. 16C illustrates a matched-filter CI receiver adapted to process single-carrier signals. Received single-carrier signals are processed in a down converter 1621. Down-converted signals are digitized in an A/D converter 1622 prior to being processed in an OFFB, such as an OFFT 1623. The A/D converter 1622 and the down converter 1621 may be embodied by an anti-aliasing filter (not shown) and a passband sampler (not shown). The OFFT 1623 separates signals into a plurality of CI component signals that are correlated with a plurality of reference component signals in a correlator. A CI reference generator 1630 generates the reference component signals provided to the correlator 1624. The correlator 1624 output may be coupled to one or more additional signal processing systems (not shown). An embodiment of the CI reference generator 1630 includes a single-carrier reference-signal generator 1631 coupled to an OFFB, such as an OFFT 1632.

Embodiments of a CI-based communication system may include interactive capabilities between the physical layer and higher layers such that a response to changing conditions and operational requirements can be directed to an appropriate physical-layer function. A CI-based transceiver adjusts time-domain and frequency-domain characteristics of transmissions by applying weights to the CI carriers. Thus, CI carriers can be processed to produce signals having desired physical-layer characteristics.

Figure 17:
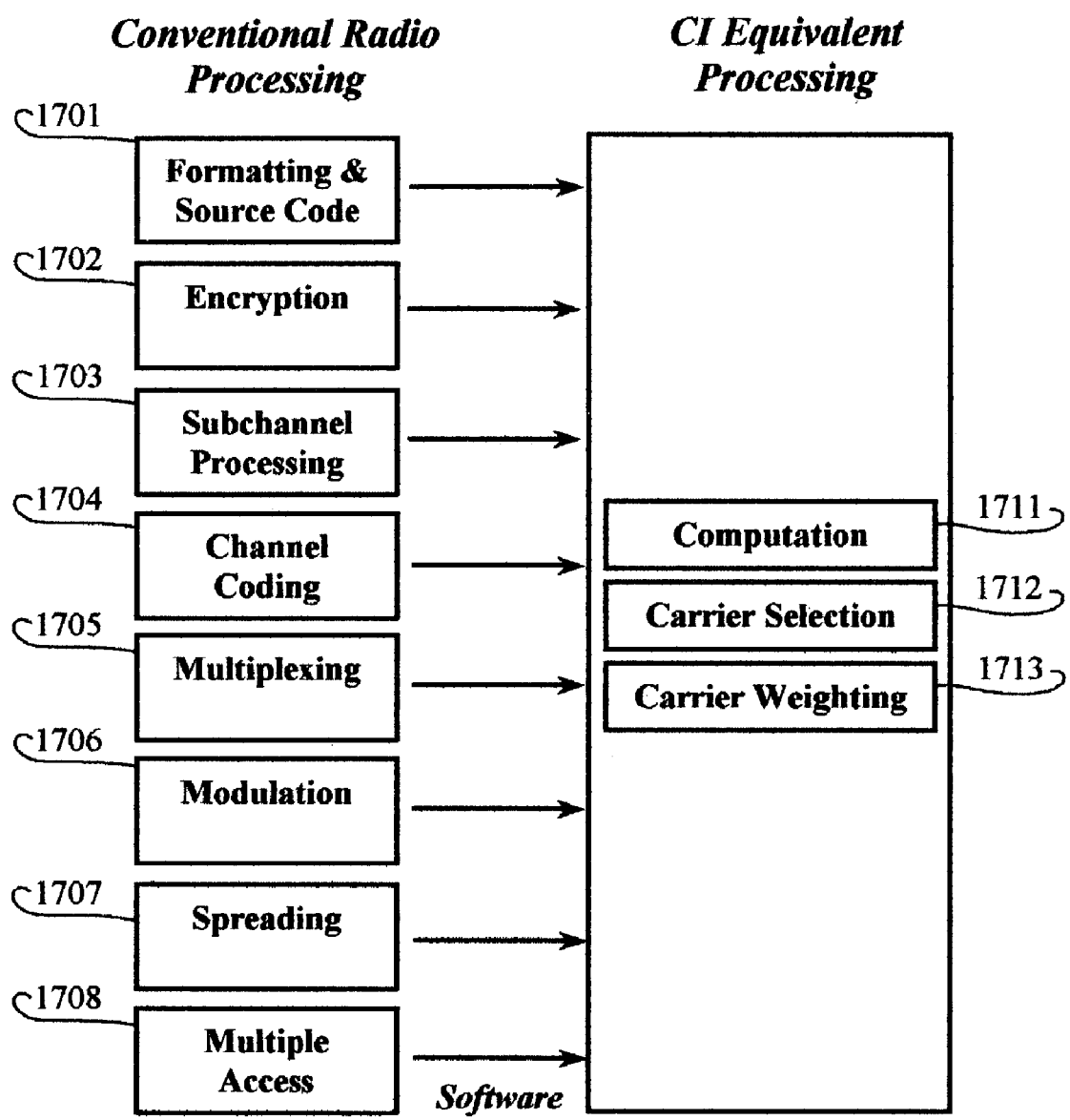
FIG. 17 illustrates how conventional radio-processing techniques can be consolidated into simple CI transceiver processes.

FIG. 17 illustrates basic physical-layer functions that are combined into three processes: CI carrier and weight calculation (i.e., computation 1711), CI carrier selection 1712, and CI carrier weighting 1713. Carrier selection and weighting perform physical-layer transceiver processes, such as formatting and source coding 1701, encryption 1702, channel selection 1703, channel coding 1704, multiplexing 1705, modulation 1706, spread-spectrum processing 1707, and multiple-access processing 1708. In one set of embodiments, the physical-layer processes 1711, 1712, and 1713 are performed via software-controlled processes, such as application programs residing in one or more memory spaces of one or more processing units.

Figure 18:
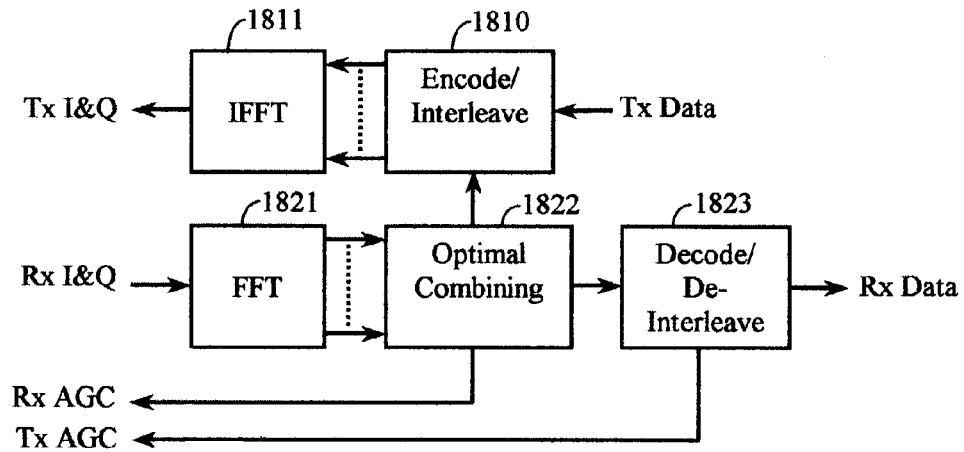
FIG. 18 illustrates basic components of a software-controlled CI transceiver.

FIG. 18 illustrates a software-controlled CI transceiver. A transmit data stream is processed by an Encoder/Interleaver software module 1810 that generates weights provided to an IFFT processor 1811. The IFFT 1811 may include a signal processing software module. The IFFT may be adaptable with respect to control signals provided by other software modules, such as the Encoder 1810.

Received signals are separated into orthogonal components by an FFT processor 1821. The FFT 1821 may be performed by a software application. Sub-carrier values are combined by a combiner 1822 prior to being decoded in a Decoder/De-interleaver 1823. The combiner 1822 and/or the Decoder 1823 may be implemented in software. The FFT 1821 may be controlled by other software modules, such as the combiner 1822 and/or the Decoder 1823. Encoding 1810 and/or decoding 1823 operations may be used to adjust combining 1822. The combiner 1822 may control encoding operations 1810, such as predistortion.

Various control signals may be generated throughout the receiver processing operations. For example, receiver performance measurements (e.g., BER, SNR, etc.) may be used to adjust various operations, such as combining. Received signal power may be used to adjust gain control of either or both the transmit side and the receive side of the transceiver. The combiner 1822 and/or Decoder 1823 may perform channel estimation to adjust the function of the Encoder 1810, combiner 1822 and/or Decoder 1823. The transceiver may be adapted to process in-phase and quadrature-phase signals.

Figure 19:
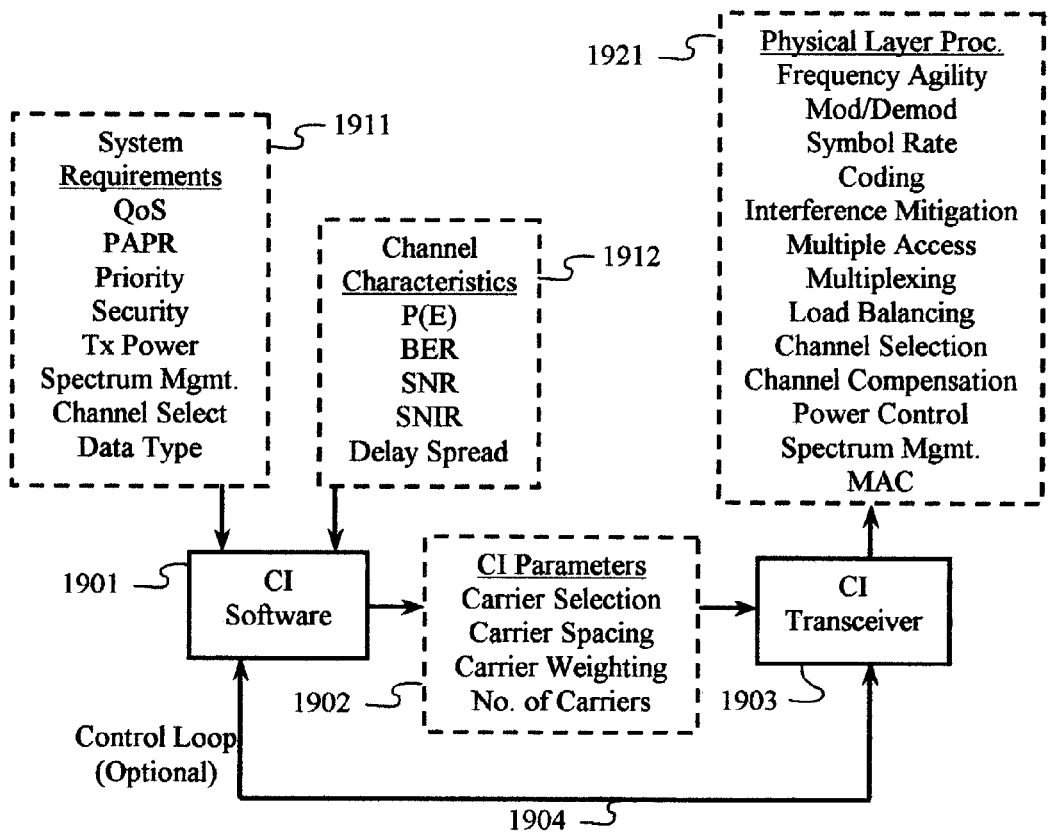
FIG. 19 illustrates a software module that processes one or more system requirements and/or one or more channel characteristics to adjust one or more CI parameters in a CI transceiver.

FIG. 19 illustrates a software-defined controller 1901 that processes one or more system requirements 1911 and/or one or more channel characteristics 1912 to control one or more CI parameters 1902 in a radio transceiver 1903. CI parameter adjustments and selections provide corresponding adjustments to the transceiver's 1903 physical-layer processes 1921. An optional feedback loop 1904 may be employed to couple the controller 1901 to the transceiver. Thus, CI signaling characteristics, such as weights, symbol duration, and CI codes may be adapted to RF operating characteristics of the transceiver.

CI codes, as used herein, may include basic CI codes or advanced CI codes. CI codes are based on phase relationships between orthogonal carriers, such as illustrated by samples 120 to 125 shown in FIG. 1A. CI codes can be used as direct-sequence codes, multicarrier codes (e.g., MC-CDMA), etc. Applications of CI codes can be extended to any application of conventional binary direct sequences, including but not limited to, spread spectrum, multiple access, channel coding, encryption, and interference mitigation. CI codes may be applied across any set of orthogonal or quasi-orthogonal diversity-parameter values or subspaces.

Basic CI codes can generated from phase relationships indicated by vector precession in the complex plane, such as shown in FIG. 3A. CI coding can be applied to circular, elliptical, and linear polarization. CI polarization codes may be based on vector precession in a two- or three-dimensional polarization plane. Advanced CI codes may be based on basic CI polarization codes. Similarly, vector rotation in a plane or a higher-dimension field of orthogonal bases may be used to generate basic and/or advanced CI codes. The basic family of CI codes is generated from an M×M matrix of elements having phases $\phi_{mn}$ described by:

$$\phi_{mn} = 2\pi mn/M + 2\pi f_o m/f_s M,$$

where m and n are row and column indices, respectively. M may have any positive integer value. The second term in $\phi_{mn}$ is an optional phase shift applied to all terms in a row. The phase-shift $\phi_{mn}$ may correspond to a carrier frequency offset $f_o$ and a sub-carrier separation $f_s$. A basic CI code $c_m$ can include a row or column vector consisting of terms:

$$c_m = e^{im\phi'} \sum_{n=0}^{N-1} e^{imn\phi} \hat{n}$$

where $\phi = 2\pi/M$ and $\phi' = 2\pi f_o/f_s M$.

Some of the CI codes are complex-conjugate pairs. For example, correlations between CI codes are expressed by the following relationship:

$$corr_{m,m'} = \left(\frac{1}{M}\right) e^{i(m+m')\phi'} \sum_{n=0}^{M-1} e^{in(m+m')\phi}$$

The correlations are non-zero for (m+m')=M.

CI codes may have polyphase and/or multi-magnitude values. A CI code set may include one or more binary code vectors corresponding to at least one conventional binary-phase code. In the case where CI codes include complex-valued chips, the real and imaginary parts may be-impressed upon different orthogonal parameters. For example, a magnitude corresponding to a real value may be modulated on an in-phase carrier component whereas a corresponding imaginary value may be modulated on a quadrature-phase carrier component.

Orthogonal components may include, but are not limited to, perpendicular linear polarizations, left-hand and right-hand circular or elliptical polarizations, polarization spins, subspaces (e.g., spatial, directional, temporal, phase, polarization, etc.), orthogonal frequencies, orthogonal time intervals, direct-sequence codes, etc. Modulation may include phase modulation, amplitude modulation, frequency modulation, polarization modulation, time-offset modulation, or any combination thereof.

Phase shifts corresponding to CI code chips may be impressed upon a single carrier or onto multiple carriers. In one embodiment, phase shifts are impressed relative to a transmitted or locally generated reference phase. In another embodiment, differential phase modulation (DPM) is employed. In one embodiment, DPM is employed on a single carrier. In another embodiment, DPM is applied to a multicarrier transmission protocol. In one embodiment, each phase shift is conveyed as a phase differential between at least two carriers.

CI codes may be applied to ordinary direct-sequence (e.g., DSSS or DS-CDMA), MC-CDMA, OFDM, coded OFDM, Discreet Multitone, Wavelength Division Multiplexing (WDM), ultra-dense WDM, Multi-tone CDMA, Multi-code spread spectrum, or any of the CI protocols. In the case where CI codes are used in a multicarrier transmission protocol, phase-shift coding may be accomplished in any of several ways. Each carrier may be phase shifted with respect to each chip of a CI code chip sequence. Each carrier may be modulated with respect to any single-carrier modulation scheme. Each carrier may be modulated with one or more CI code chip encoded subcarriers. Each carrier may be provided with at least two diversity parameters that are modulated to convey real and imaginary parts of CI codes chips.

Multicarrier signals may be defined by any set of substantially orthogonal diversity-parameter values. These diversity parameters may include, without limitation, frequency, phase space, polarization (including linear, circular, elliptical) in two or three dimensions, mode, code (e.g., DS and/or CI), time, any type of subspace, and any combination thereof.

Advanced CI codes can involve one or more types of processing applied to basic CI codes. Some examples of advanced CI codes include matrices resulting from processing basic CI codes with a Hadamard-Walsh matrix, matrices derived from Hadamard-Walsh/CI matrices, and expanded CI matrices based on Hadamard-Walsh matrix expansion.

The basic CI codes can be combined (with each other or with other direct-sequence codes) to form other families of polyphase and/or poly-magnitude CI codes. In any set of CI codes, the chip sequences may be truncated, appended, rearranged, concatenated, etc., to generate orthogonal or quasi-orthogonal chip sequences. Codes of similar or different lengths may be concatenated. Different chip sequences may be combined in such a way that at least one chip sequence is interleaved with chips from at least one other code.

CI code vectors may be multiplied by other code vectors including, but not limited to, direct-sequence codes, complementary codes, and/or other CI codes. Groups of CI code chips may be modulated (scaled and/or shifted) with respect to other code chips. A CI code may be overlayed with a long code, a Hadamard-Walsh code, a Barker code, a Gold code, a Kasami code, a Golay code, a CI code, or some other code. CI coding may include multiple levels of coding wherein at least one set of code chips modulates at least one other set of code chips.

Basic CI codes form an orthonormal basis. New orthonormal bases can be generated by linearly combining CI codes of a particular length. More advanced permutations of CI codes may also be provided to form orthonormal bases. The orthonormal bases may be multiplied by code chips of other sequences, such as Hadamard-Walsh, Gold, CI, etc.

Data symbols may be mapped to CI codes to provide channel coding. For the purpose of mapping, bi-orthogonal CI codes may be generated by including a code set multiplied by the value $-1$. CI codes may be used to generate trans-orthogonal (e.g., simplex) codes. Quasi-orthogonal mapping may be performed by phase shifting or scaling the CI codes. A second set of orthogonal CI codes may be generated by rotating the phase of a first code set by $\pi/2$, thus providing in-phase and quadrature CI codes.

CI-coded symbols may be decoded by correlating a coded signal with a complex-conjugate code. A received signal may be processed with an FIR filter having coefficients set appropriately to decode a desired signal. The received signal may be sampled and summed. Optionally, samples of the received signal may be weighted prior to being summed to compensate for any of various effects, such as channel distortions, transmitter-side encoding (e.g., to reduce PAPR), jamming, etc. Weighting may be performed with respect to one or more optimization processes in which weights are adjusted with respect to at least one measurement, such as signal to noise, signal to noise plus interference, probability of error, BER, received signal power, etc.

The received signal may be phase shifted with respect to chip phases of a decoding signal. If a received signal includes multiple samples per chip interval, the chip samples may be time shifted with respect to the chip phases of the decoding signal. The samples corresponding to each chip may be cyclically shifted with respect to a decode chip sequence. Subsequent processing, such as sampling, adding, comparison, and/or decision making (hard and/or soft) may be performed to evaluate data symbols measured after the decoding process.

FIG. 20A shows a set of 16 octonary code vectors $C(n)$ resulting from multiplying an 8×8 basic CI code matrix $CI_{8 \times 8}$ by rows of an 8×8 Hadamard-Walsh matrix $HW_{8 \times 8}$. An 8×8 matrix resulting from a product of a matrix $CI_{8 \times 8}$ by a row of matrix $HW_{8 \times 8}$ includes two binary-phase 8-chip codes (which correspond to rows of matrix $HW_{8 \times 8}$), two quaternary-phase code vectors, and four octonary-phase code vectors including two complex-conjugate pairs. The 16 code vectors $C(n)$ are selected from octonary-phase vectors in matrices resulting from products of vectors of $HW_{8 \times 8}$ with CI code matrix $CI_{8 \times 8}$.

FIG. 20B shows auto correlations and cross correlations of the 16 octonary codes $C(n)$ shown in FIG. 20A. The correlation relationships may be used to choose orthogonal or quasi-orthogonal code sets from the codes $C(n)$. For example, the codes $C(1)$, $C(1)^*$, $C(2)$, $C(2)^*$, $C(4)$, $C(4)^*$, $C(7)$, and $C(7)^*$ form an orthogonal eight-code set. The code pair $\{C(1), C(1)^*\}$ has zero cross correlation with $C(2)$, $C(2)^*$, $C(4)$, $C(4)^*$, $C(7)$, and $C(7)^*$ and thus, can be used with these codes to provide orthogonal code sets. Code $C(1)$ has a non-zero cross correlation with codes $C(1)^*$, $C(5)$, and $C(6)^*$. Thus, an orthogonal set may include codes $C(1)$ and $C(5)$, and exclude codes $C(1)^*$ and $C(6)^*$. The codes $C(3)$, $C(3)^*$, $C(5)$, $C(5)^*$, $C(6)$, $C(6)^*$, $C(7)$, and $C(7)^*$ form another orthogonal eight-code set. Codes $C(7)$, $C(3)$, $C(8)$, $C(4)$, $C(1)$, $C(5)$, $C(2)$, and $C(6)$ form yet another orthogonal eight-code set. Many other code sets, including quasi-orthogonal codes, are possible.

Orthogonal and quasi-orthogonal code sets may be implemented separately or simultaneously. Code sets may include combinations of different M-ary polyphase codes. An M-ary code set may include codes with a code length (i.e., number of code chips) that is less than or greater than M. Code sets may include numbers of codes that are less than or greater than the code lengths. Code sets may include same-length and/or different-length codes.

Although basic CI codes and one family of advanced CI codes are described herein, many other implementations of coding based on CI are clearly anticipated. CI code sets may be selected or manipulated to provide cross-correlation values that are shifted by $\pi/2$. CI codes may be used to generate bi-orthogonal and/or trans-orthogonal CI code sets. CI codes may include linear combinations of other CI codes. CI codes may be derived from Hadamard-Walsh matrix expansion, code concatenation, code interleaving, code superposition, and/or weighted code superposition wherein weights are applied to one or more code chips. A CI code may include at least one set of CI matrix elements, such as a row, a column, a diagonal, and/or matrix elements selected with respect to some predetermined pattern.

CI code chips may be cyclically shifted, swapped, or otherwise re-ordered. CI codes may be implemented as multi-level codes with one or more codes that are not necessarily CI codes. Multiple codes including at least one CI code may be interleaved. CI codes may be interleaved with same length or different length codes. CI codes may be implemented in block coding, convolutional coding, turbo coding, any other form of channel coding, encryption, multiple-access coding, spread-spectrum coding, peak-power mitigation, etc. CI codes may be implemented with orthogonal coding, quasi-orthogonal coding, bi-orthogonal coding, trans-orthogonal coding, or any combination thereof.

CI codes may be generated by convolving at least one set of CI codes with at least one other set of codes, including one or more of the following: CI codes, binary direct-sequence codes, channel codes, spreading codes, multiple-access codes, etc. CI codes may be provided with one or more parity-check symbols formed from linear combinations of data symbols and/or code chips.

Figure 21A:
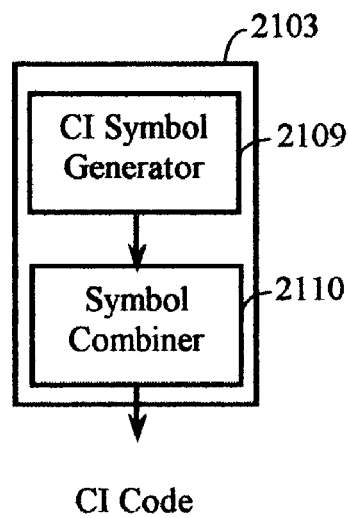
FIG. 21A illustrates basic components of a CI-code generator

FIG. 21A illustrates basic components of a CI-code generator 2103. A CI-symbol generator 2109 generates a plurality of CI symbols that are coupled to a symbol combiner 2110. The symbol combiner 2110 groups the CI symbols to generate one or more CI codes.

A CI-symbol generator, such as the CI-symbol generator 2109, includes any algorithm, system, or device adapted to generate a plurality of CI symbols. CI symbols include basic CI symbols. CI symbols may be discreet-valued or continuous-valued numbers or functions. CI symbols may be values derived from at least one invertible transform function, such as a Fourier transform, a Laplace transform, a Walsh transform, a wavelet transform, etc. CI symbols may include linear combinations of other CI symbols, linear combinations of CI symbols with other code symbols, CI symbols modulated with code sequences from a predetermined code set including one or more of the following: spread-spectrum codes, multiple-access codes, channel codes, encryption codes, multi-level codes, compression codes, hybrid codes, and CI codes.

A CI symbol combiner, such as the symbol combiner 2110, includes any algorithm, system, or device adapted to group CI symbols to generate at least one CI chip sequence. A symbol combiner may append, concatenate, interleave, shift, puncture, or re-order one or more symbol sets. A symbol combiner may combine CI symbols with other symbols. A symbol combiner may provide a CI chips sequence with at least one parity-check symbol.

Figure 21B:
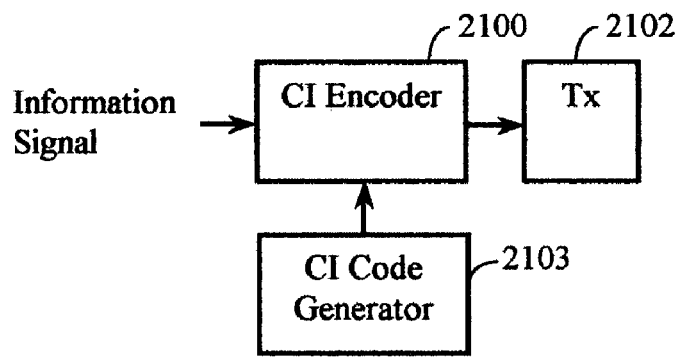
FIG. 21B illustrates basic components of a CI transmitter.

FIG. 21B illustrates a CI transmitter adapted to generate at least one CI-coded information signal. A CI encoder 2100 encodes at least one input information signal relative to at least one CI code produced by a CI code generator 2103. CI coded information signals are optionally coupled to a transmission system 2102 that may include a pre-transmission processor (not shown).

Figure 21C:
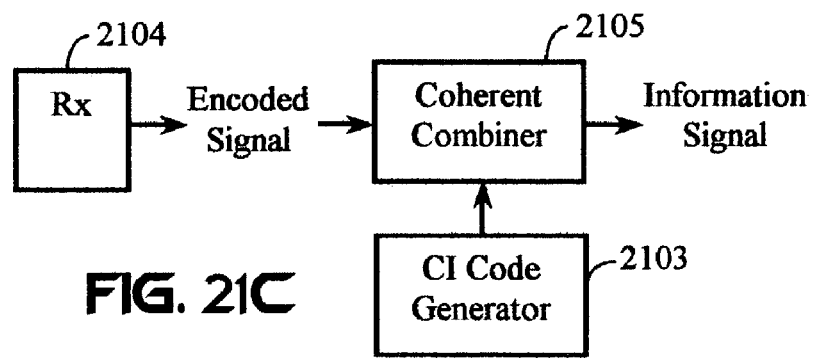
FIG. 21C illustrates basic components of a CI decoder.

FIG. 21C illustrates basic components of a CI decoder that include a CI code generator 2103 and a coherent combiner 2105 adapted to decode at least one CI-encoded signal with respect to at least one code generated by the CI code generator 2103. Optionally, the decoder may be coupled to a front-end receiver processor 2104 that provides the at least one CI-encoded signal to the decoder.

Channel coding provides signal transformations that are designed to improve communication performance by enabling transmitted signals to better withstand the effects of various channel impairments (e.g., noise, fading, interference). CI channel coding may include waveform coding and/or structured sequences. CI waveform coding (such as M-ary signaling, orthogonal coding, bi-orthogonal coding, trans-orthogonal coding, etc.) transforms waveforms to make them less subject to error. CI-structured sequences transform a data sequence into one or more sequences having structured redundancy. Redundant bits are used for detecting and/or correcting errors.

CI coding may include replacing a data set with an orthogonal codeword set. In one embodiment, a CI coder may multiplex multiple coded data symbols together by providing an orthogonal codeword set. A CI codeword set may be selected in which each codeword vector has zero projection onto all other CI codeword vectors except for its complex conjugate. A decoder may include multiple matched filters (or equivalent systems or algorithms) that output zero unless a corresponding encoded data symbol is received.

Figures 22, 23:
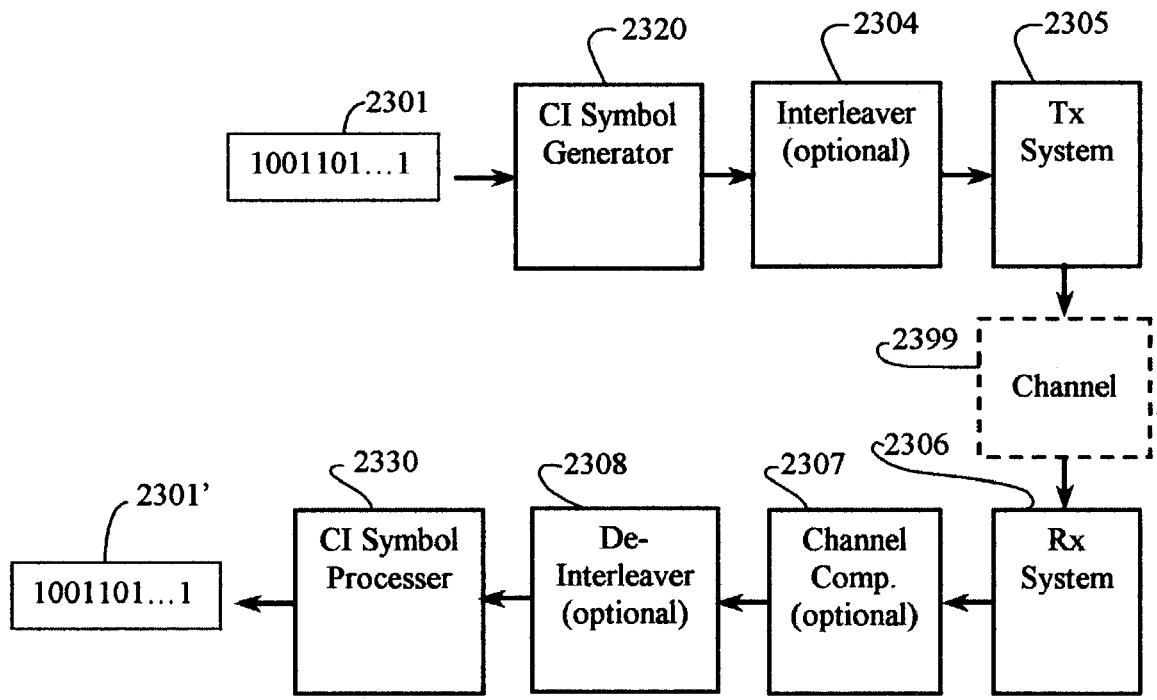
FIG. 22 illustrates the relationship between basic CI symbol values $w_n$ and data symbols $s_n$ processed with CI code chips to produce the CI symbol values $w_n$.
FIG. 23 illustrates basic components of a CI coding system and a CI decoding system.

FIG. 22 illustrates a relationship between CI symbol values $w_n$ and data symbols $s_n$. CI code chip values are arranged in columns with respect to phase spaces, such as phase space (column) 2201. A phase space may be analogous to a pulse position. The phase spaces (e.g., pulse positions) may be orthogonal or quasi-orthogonal. Thus, the number of CI symbols $w_n$ may differ from the maximum number of data symbols $s_n$. Each data symbol value $s_n$ is impressed upon a phase space such that each set of CI code chip values expresses the value of the corresponding data symbol $s_n$. Each code chip value is analogous to a complex weight applied to a particular CI carrier. A superposition of these carriers produces a CI waveform bearing the data symbol value $s_n$, such as at a particular pulse position.

A CI superposition waveform bearing multiple data-symbol/pulse-position characteristics can be created by applying weights to CI carriers that correspond to sums of carrier weights for each data-symbol/pulse-position. Similarly, each CI symbol, such as symbol $w_2$, corresponds to a summed row of data-bearing CI code chips, such as row 2202. The code chips may be transmitted over multiple time intervals, carrier frequencies, polarizations, and/or other orthogonal diversity parameter values.

Decoding may include any appropriate inverse of the coding operation represented by FIG. 22. For example, to extract an $n^{th}$ data symbol value $s_n$ from a vector of received CI symbol values w, the complex conjugate of a vector of the $n^{th}$ phase space (or CI code) values $w_n$ may be correlated with the received CI symbol vector w. Equivalent decoding processes may be performed. The decoding process may be performed with respect to one or more combining techniques, such as, but not limited to, MMSE, EGC, maximum likelihood combining, or any combination thereof. Decoding may include turbo decoding.

FIG. 23 illustrates basic components of a CI coding system and a CI decoding system. A data symbol stream 4701 is processed by a CI symbol generator 2320 that outputs a plurality of CI symbol values $w_n$ representing a coded version of the data symbols $s_n$. The symbols $w_n$ may be interleaved by an optional interleaver 2304 prior to being prepared for transmission into a communication channel 2399 by a pre-transmission processor (not shown) in a transmission system 2305. The symbols $w_n$ are typically multiplexed onto one or more diversity-parameter spaces prior to transmission.

A receiver system 2306 couples transmitted signals from the channel 2399, and a front-end receiver processor (not shown) performs any necessary processing, such as filtering, amplification, demultiplexing, de-spreading, decoding, and/or beam forming, prior to outputting an IF or baseband digital signal. Optionally, channel compensation 2307 may be performed to mitigate effects of channel distortion and/or interference. Any necessary de-interleaving processes 2308 may be performed prior to processing by a CI symbol decoder 2330. The decoder 2330 processes received CI symbols $w'_n$ to produce data-symbol estimates 2301'. The data-symbol estimates 2301' may be output to additional signal-processing systems (not shown).

The CI Symbol Generator 2320 converts a predetermined number of input data symbols $s_n$ to a plurality of CI code symbols $w_n$. This conversion may involve summing information-modulated CI code chips. A first step in a CI symbol generation process may include generating code chips and/ or acquiring code chips stored in memory or received from an input data stream. Code chips may be generated from a reduced set (e.g., an orthonormal basis) of code chips or code vectors.

A second step in a CI symbol generation process involves impressing at least one data symbol $s_n$ onto at least one set of code chips. The code chips may be multiplied, phase shifted, modulated, or otherwise impressed with data symbol values $s_n$. The code chips may represent a phase space, such as a pulse position. Optionally, the code chips may be provided with phase offsets, such as for crest-factor reduction or encryption.

A third step in a CI symbol generation process involves combining the code chips to produce one or more CI code symbols $w_n$. FIG. 22 illustrates how rows of information-modulated CI code chips are summed to produce CI code symbols $w_n$. Predistortion may be provided applying channel-compensation weights to the CI code symbols $w_n$.

The decoder 2330 processes received CI symbols $w'_n$ to produce data-symbol estimates 2301'. A first step in a CI decoding method includes generating code chips and/or acquiring code chips stored in memory or received from an input data stream. Code chips may be generated from a set of orthonormal codes or a subset of chips comprising one or more orthonormal codes.

A second step in a CI signal processing method includes combining or correlating at least one vector of the code chips with a vector of the received data symbols $w'_n$. A correlation process may include a scalar multiplication between the code chip vector and the received data symbol vector followed by combining (e.g., integrating) the products. Another embodiment of correlation includes adding together selected samples over a predetermined symbol interval $T_s$. Additional processing may be performed to produce estimates of the transmitted data symbols.

The decoder 2330 may perform various types of combining, such as weighted combining as part of an MMSE, EGC, maximal likelihood, or any other performance-based optimization process. The decoder 2330 may perform channel compensation. The decoder 2330 may include a front-end receiver processor (not shown).

The bandwidth requirements for bi-orthogonal CI codes are half of the requirements for comparable orthogonal codes. Bi-orthogonal codes have slightly better performance over orthogonal codes because antipodal signal vectors have better distance properties than orthogonal signals. Trans-orthogonal (e.g., simplex) codes, when compared to orthogonal and bi-orthogonal codes, require the minimum SNR for a particular symbol error rate. Channel codes may be overlaid onto multiple-access codes. Depending on the processing gain of the multiple-access codes, channel coding may not require additional bandwidth.

Figure 24:
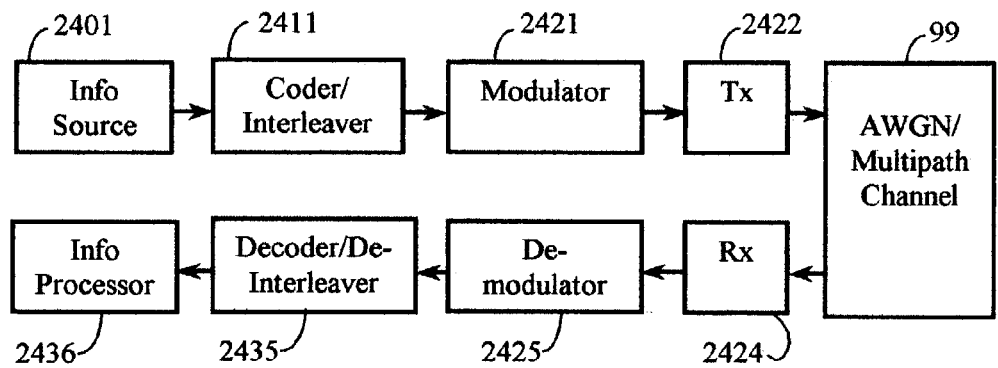
FIG. 24 shows a system diagram of a CI transceiver.

FIG. 24 shows a system diagram of a CI transceiver. An information source 2401 provides data symbols to a CI coder/interleaver 2411. A modulator 2421 modulates the coded symbols onto one or more carriers that are transmitted by a transmitter 2422 into a communication channel 99. The channel 99 may be characterized by AWGN and/or multipath. Other channel distortions may be considered. A receiver 2424 couples the transmitted signals from the channel 99. A demodulator 2425 retrieves symbols from the received signal. A CI decoder/de-interleaver 2435 decodes (and de-interleaves, if necessary) the received symbols into information symbols that are optionally processed in an information processor or sink 2436.

In one embodiment, the coder 2411 maps data symbols to CI code words using a look-up table. In another embodiment, the CI code words are generated with respect to each data symbol. Codeword generation may be performed with a CI code generation matrix G. CI codes of a given set of CI code words may be constructed from a combination of linearly independent code vectors that form the CI code generation matrix G.

Although code generation is described with respect to basic CI codes, orthonormal basis vectors and a corresponding CI code generation matrix may be constructed for advanced CI codes. Each code in a basic CI code set can be defined by a different number of full rotations in the complex plain. For example, an orthonormal basis for a set of N=64 basic CI codes can be defined by the CI code generation matrix:

$$G = \begin{bmatrix} C(\text{rotations} = 1) \\ C(\text{rotations} = 2) \\ C(\text{rotations} = 4) \\ C(\text{rotations} = 8) \\ C(\text{rotations} = 16) \\ C(\text{rotations} = 32) \end{bmatrix}$$

where C(rotations=m), m=0,1, . . . , N−1, is a code vector corresponding to:

$$C(m) = e^{im\phi'}(1, e^{im\phi}, e^{i2m\phi}, \ldots, e^{i(N-1)m\phi})$$

Since this basic CI code set is totally defined by G, the coder 2411 needs to store only k rows of G instead of $2^k$ vectors of the CI code matrix. Furthermore, since the first half of each row vector C(m) of G is the same as the second half (except C(1)'s first and second halves differ by a factor of −1), the coder 2411 and decoder 2435 need only store one half of each row vector C(m).

A CI receiver may perform error detection using any of several techniques. Symmetry relationships between the first and second halves of a received code can be exploited to determine whether an error occurred. Other relationships between code symbols may be used to provide error detection and/or correction. For example, adjacent CI code symbols (except for the all-ones code) are typically not identical. Depending on the code, the values of adjacent code symbols change in a predetermined way. For example, adjacent code chips of an $m^{th}$ basic code C(m) differ by $e^{im\phi}$.

A parity-check matrix H (defined by the equation, $GH^T=0$) can be used to test whether a received vector is a member of a codeword set. The decoder 2435, upon detecting an error, may perform forward error correction and/or request a retransmission. Preferably, the decoder 2435 estimates the transmitted code vector using some optimizing strategy, such as the maximum-likelihood algorithm. The receiver may erase ambiguous signals. The decoder 2435 may implement error correction to correct erasures and/or errors.

It is preferable that the coder 2411 select codes that maximize the Hamming distance between codes. An advantage of using polyphase codes is that they provide a superior Hamming distance compared to binary codes. For example, (n,k)=(8,3) binary code has an n-tuple space of $2^n=2^8=256$ binary words, of which $2^k=2^3=8$ are code words. An octonary-phase (m=8) (8,3) code has an n-tuple space of $2^{mn}=2^{64}$ octonary words. The fraction of words that are code words decreases dramatically with increasing values of m. When a small traction of the n-tuple space is used for code words, a large Hamming distance can be created.

CI codes may be processed as cyclic codes, which are described in many prior-art references, such as B. Sklar, *Digital Communications, Fundamentals and Applications*, Prentice-Hall, Inc., New Jersey, 1988. For example, components of a CI code vector $C=(C_0, C_1, \ldots, C_{N-1})$ can be treated as coefficients of a polynomial $U(X)$, as follows:

$$U(X)=u_0+u_1X+u_2X^2+\ldots+u_{N-1}X^{N-1}$$

where $X=e^{j2\pi nk/N}$, where k is the order of the code: k=0, 1, ..., N−1. Well-known cyclic code processing may then be performed.

Figure 25:
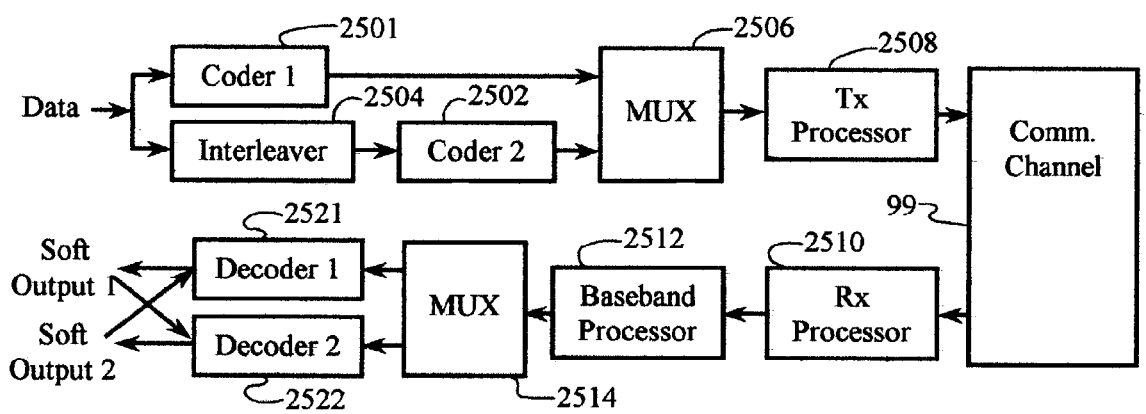
FIG. 25 illustrates basic components of a turbo coder/decoder system that may be used to process CI codes.

FIG. 25 illustrates basic components of a turbo coder/decoder system that may be used to process CI codes. A data sequence is encoded with at least two CI-based error-correction codes applied by at least two coders 2501 and 2502. The data sequence is interleaved by an interleaver 2504 prior to encoding by the second coder 2502. The coded data symbols are multiplexed together into a single symbol stream that may be processed by a transmit processor 2508 before being coupled into a communication channel 99.

Received signals from the communication channel 99 are optionally processed by a receiver processor 2510. Basic signal-processing tasks, such as amplification and filtering, may be performed by the receiver processor. A baseband processor 2512 converts the received signals into a digital symbol stream. A demultiplexer 2514 separates the resulting symbol stream into two symbol streams. Each symbol stream is processed in one of a plurality of CI decoders, such as decoders 2521 and 2522.

CI turbo coding combats random and burst errors by combining CI-based error-correction coding and interleaving. A first CI code is provided to encode a data stream. A second CI code encodes an interleaved version of the data stream. Each decoder 2521 and 2522 provides de-interleaving (if necessary) and decoding. The output of one decoder 2521 aids the other decoder 2522 in an iterative fashion. Soft decision outputs from each decoder 2521 and 2522 are provided to the other decoder 2522 and 2521. Soft decisions indicate reliability of a symbol estimate produced by a decoder. Preferably, the first soft decision is produced by the decoder 2521 or 2522 provided with the highest signal strength. This ensures higher reliability and, thus, reduces the number of iterations.

The demultiplexer 2514 may include an optimal combiner (not shown). The demultiplexer 2514 may include other types of receivers and receiver components including, but not limited to, a multi-user detector, an interference canceller, a spatial interferometry demultiplexers, and/or a spatial beam former. The demultiplexer 2514 may be provided with soft-decision values from either or both of the decoders to facilitate optimal reception.

Figure 26:
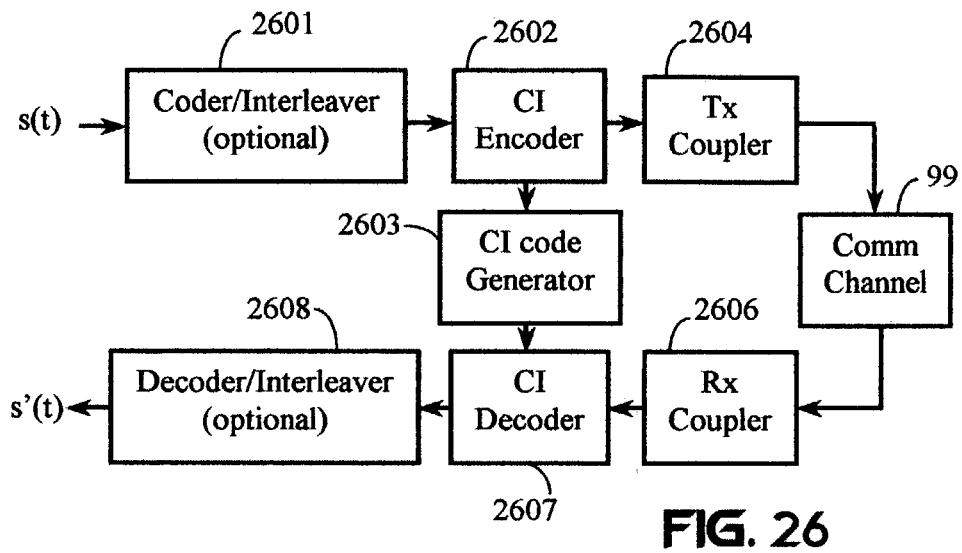
FIG. 26 illustrates basic components of a CI transceiver.

FIG. 26 illustrates a CI transceiver of the invention. An information signal, such as a stream of data bits or data symbols may be processed with an optional coder/interleaver 2601. The coder/interleaver 2601 may perform channel coding, error-correction coding, error check coding, interleaving, and/or any other type of data processing typically performed prior to multiple-access or spread-spectrum coding.

Data symbols are coupled to a CI encoder 2602, such as a modulator, that impresses the data symbols onto at least one CI code generated by a CI-code generator 2603. A CI-code generator, such as the CI-code generator 2603, includes any algorithm, device, or system adapted to generate CI codes as described and/or defined herein. A CI encoder, such as the CI encoder 2602, includes any algorithm, device, or system adapted to combine, merge, or otherwise impress at least one data symbol onto a plurality of CI code chips. The CI encoder 2602 may impress each CI code chip onto one or more diversity-parameter values prior to or after impressing data symbols onto the CI code. A CI code may be impressed onto at least one IF carrier. The CI encoder 2602 may perform multiplexing. For example, the CI encoder 2602 may encode data streams onto different CI codes. The CI encoder 2602 may employ other diversity parameters to separate multiple data streams.

Encoded data is coupled to a transmit coupler 2604 that optionally performs carrier-frequency (e.g., RF or optical) processing on the encoded data prior to coupling the encoded data into a communication channel 99. The transmit coupler 2604 may up convert baseband or IF data symbols to RF or optical signals. The transmit coupler 2604 may modulate one or more carriers with the encoded data symbols prior to transmission. The transmit coupler 2604 may impress CI code chips onto one or more sets of diversity-parameter values. For example, the transmit coupler 2604 may include a beam former (not shown).

A receive coupler 2606 couples received signals from the communication channel 99 and converts the signals to some form (e.g., baseband) that facilitates processing by the rest of the receiver portion of the transceiver. The receive coupler 2606 typically performs carrier-frequency processing on the received signals. The receive coupler 2606 may down-convert the received signals to baseband or IF signals. The receive coupler 2606 may perform diversity combining, multi-user detection, sub-carrier processing, interference cancellation, sub-space processing, beam forming, channel characterization, channel compensation, and/or various types of adaptive processing.

The receive coupler 2606 provides CI-encoded data symbols to a CI decoder 2607, such as a demodulator, that also receives an input from the CI-code generator 2603. The CI decoder 2607 extracts or estimates the data symbols encoded with at least one CI code and possibly distorted by the communication channel 99. The CI decoder 2607 may include an optimal receiver, a channel estimator, and/or a channel compensator.

Decoded data symbols may be optionally processed in a decode-signal processor 2608. The decode-signal processor 2608 may be integrated with the CI decoder 2607. The decode-signal processor 2608 may include a decision processor that generates hard and/or soft decisions. The decode-signal processor 2608 may include a feedback loop to the CI decoder 2607 and/or the receive coupler 2606 to adjust processing with respect to one or more signal-quality measurements. The decode-signal processor 2608 may convert decoded data symbols into an information bit stream.

A CI decoder, such as the CI decoder 2607, is any algorithm, device, or system adapted to decode at least one CI-encoded signal. A CI-encoded signal typically is a CI-encoded information-bearing signal. A CI decoder may convolve and/or correlate at least one decode signal with the at least one CI-encoded signal to extract the at least one information signal or at least one estimate of the information signal. A CI decoder may perform hard and/or soft estimates of the information signal. The CI decoder may include multiple decoders and perform an iterative process of conveying soft decisions between the multiple decoders. The CI decoder may perform one or more of the following: de-interleaving, channel decoding, multiple-access decoding, demultiplexing, demodulating, decrypting, channel analysis, channel compensation, despreading, error detection, and error correction. A CI decoder may provide corrective phase offsets to compensate for non-zero phase signals, channel distortion, and/or phase offsets applied to transmitted signals to achieve some predetermined objective, such as minimizing PAPR, enhancing security, etc.

A decode-signal processor, such as the decode-signal processor 2608, is any algorithm, device, or system that is adapted to process at least one decoded signal. The decode-signal processor may provide hard and/or soft decisions when evaluating the decoded signal. The decode signal processor may include one or more quantizers, comparators, iterative decoders, feedback loops, interference cancellers, optimal detectors, and/or any other devices that contribute to a decision and/or detection process. The decode-signal processor may provide conventional decoding in addition to CI decoding. The decode-signal processor may decode block-encoded signals, convolutional-encoded signals, encrypted signals, turbo-coded signals, compressed signals, etc. The decode-signal processor may perform demultiplexing and/or de-interleaving. The decode-signal processor may perform multi-user detection, optimal combining, diversity reception, or any other technique designed to enhance signal quality by mitigating the effects of interference, distortion, and/or noise.

Figure 27A:
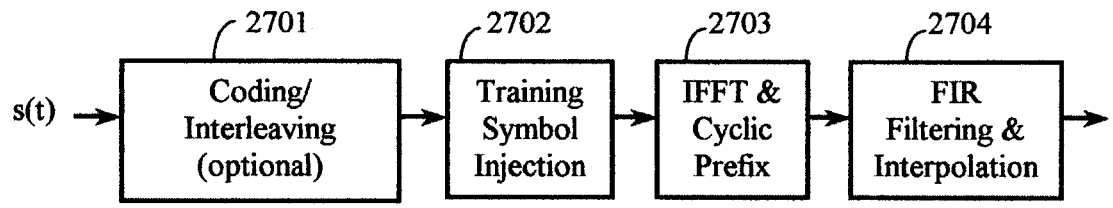
FIG. 27A illustrates general steps of a transmitting method of the present invention.

FIG. 27A illustrates general steps of a transmitting method of the present invention. An information signal s(t) is optionally encoded and/or interleaved 2701. Preferably, alternative coding includes CI or CI-based coding. The coding/interleaving step 2701 may include generating or otherwise acquiring symbol values to be impressed onto multiple carriers. The information signal may be provided with predetermined training symbols in a training symbol injection step 2702. Training symbols may be used for channel estimation, signal-quality estimations, synchronization, etc. An IFFT 2703 or equivalent process impresses the coded data symbols onto a plurality of carriers. Optionally, a cyclic prefix may be added to the coded data symbols. An FIR filtering and interpolation step 2704 is performed prior to preparing the resulting signal for transmission into a communication channel (not shown).

Various steps and implied systems shown in FIG. 27A may be included in transmission systems and methods pertaining to other aspects and embodiments of the invention. Furthermore, various signal-processing steps that are typically performed in transmission systems may be included herein. For example, pre-equalization steps and/or systems may be included in the transmitter embodiments shown in FIG. 27A. Array processing may be performed after FIR filtering and interpolation 2704. Alternatively, array processing may be integrated into coding 2701, IFFT 2703, and/or FIR filtering 2704.

Figure 27B:
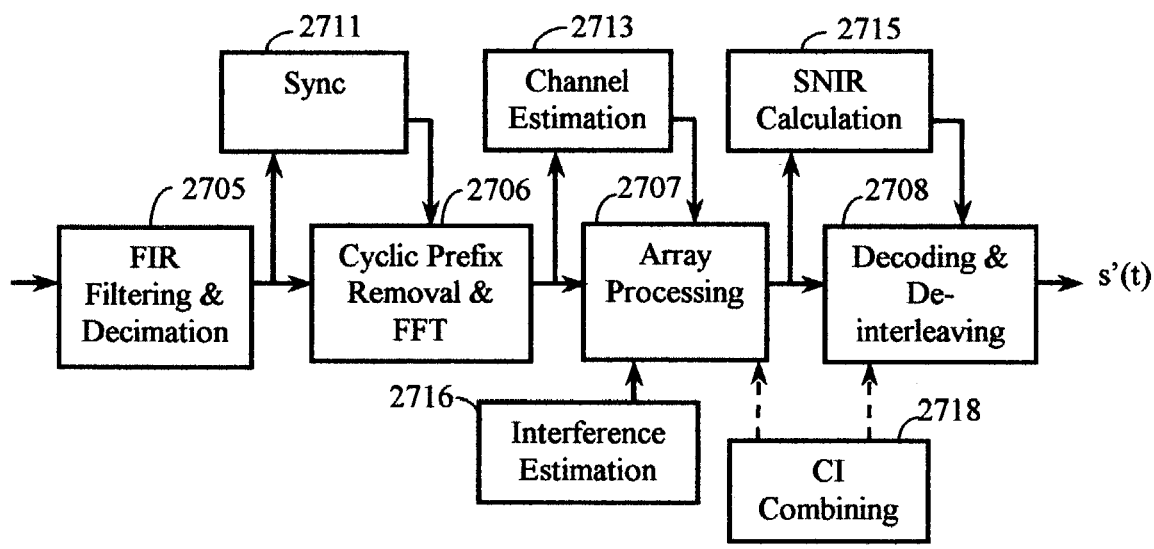
FIG. 27B illustrates general steps of a receiving method that may be performed in conjunction with the transmitting method illustrates in FIG. 27A.

FIG. 27B illustrates general steps of a reception process of the present invention. One or more transmitted signals are coupled out of a communication channel (not shown) and provided to an FIR filtering and decimation step 2705. Filtered signals may be processed in a synchronization step 2711 to control the timing of various reception processes, such as, but not limited to Cyclic prefix removal and FFT 2706. Complex-amplitude values associated with individual carrier frequencies, such as estimates obtained via known training symbols and/or unknown data symbols, may be used in a channel-estimation step 2713. The channel estimation step 2733 can facilitate the generation of weights (e.g., array-processing and/or CI combining weights).

Array processing 2707 is performed to achieve some preferred combination of system capacity (i.e.; sub-channel generation) and signal quality (i.e., diversity combining). For example, array processing may include spatial interferometry multiplexing and/or any other form of array processing. Array processing 2707 may be assisted by an interference-estimation step 2716. A CI combining step 2718 may be performed in conjunction with the array-processing step 2707 and/or a decoding and deinterleaving step 2708. Alternatively, either or both the array-processing step 2707 and the decoding and deinterleaving step 2708 may perform CI combining 2718. The decoding and deinterleaving step 2708 performs any necessary deinterleaving of data symbols received from the array-processing step 2707 prior to, or following decoding. Decoding may include channel, multiple access, spread spectrum, encryption, and/or other decoding processes.

In the preferred embodiments, several kinds of CI processing are demonstrated to provide a basic understanding of CI filtering, CI-based Fourier transforms, and software-controlled physical-layer processing. With respect to this understanding, many aspects of this invention may vary.

For illustrative purposes, flowcharts, system diagrams, and signal diagrams represent the operation of the invention. It should be understood, however, that the use of flowcharts and diagrams is for illustrative purposes only, and is not limiting. For example, the invention is not limited to the operational embodiment(s) represented by the flowcharts. The invention is not limited to specific signal and system architectures shown in the drawings. Instead, alternative operational embodiments and system architectures will be apparent to persons skilled in the relevant art(s) based on the discussion contained herein.

Alternate embodiments (equivalents, extensions, variations, deviations, combinations, etc.) of the methods and structural embodiments of the invention and the related art will be apparent to persons skilled in the relevant arts based on the teachings contained herein. The invention is intended and adapted to include such alternate embodiments. Such equivalents, extensions, variations, deviations, combinations, etc., are within the scope and spirit of the present invention.

Signal processing with respect to sinusoidal oscillating signals are described herein. Those skilled in the art will recognize there are other types of periodic oscillating signals that could be alternatively used, including, but not limited to sinc waveforms, square waves, triangle waves, and repetitive noise signals.

The foregoing discussion and the claims that follow describe the preferred embodiments of the present invention. With respect to the claims, it should be understood that changes can be made without departing from the essence of the invention. To the extent such changes embody the essence of the invention, each naturally falls within the breadth of protection encompassed by this patent. This is particularly true for the present invention because its basic concepts and understandings are fundamental in nature and can be broadly applied.

The invention claimed is:

1. A CI filter adapted to separate at least one symbol impressed on at least one CI carrier of a plurality of CI carriers having a frequency spacing of $f_s$, the filter including:
   a sampler adapted to sample the CI signals at a sampling frequency including at least one frequency of a set, the set including a frequency $f_n$ of a desired CI carrier, a harmonic of $f_n$, and a sub-harmonic of $f_n$, the sampler generating a plurality of sample values and
   a combiner coupled to the sampler, the combiner adapted to combine the samples, the combiner including a time base adapted to direct the combiner to combine at least one set of the samples collected over a symbol period of $T_s=1/f_s$ to recover at least one received data symbol on the desired CI carrier.

2. The CI filter recited in claim 1 wherein the combiner includes a weighting system adapted to provide weights to the samples.

3. The CI filter recited in claim 1 wherein the combiner includes an optimal combiner.

4. The CI filter recited in claim 1 wherein at least one of the sampler and the combiner includes an in-phase and a quadrature-phase processor.

5. The CI filter recited in claim 1 further comprising a processor coupled to the combiner, the processor including at least one of a set of signal processors, the set including a channel decoder, a demodulator, a trellis decoder, an encryption decoder, a filter, a correlator, a multi-user detector, a decision system, a deinterleaver, a multi-user detector, a combiner, and an A/D converter.

6. The CI filter recited in claim 1 further comprising an anti-aliasing filter coupled to the sampler, the anti-aliasing filter adapted to pass a predetermined set of CI carriers.

7. The CI filter recited in claim 1 further comprising a frequency converter adapted to adjust a carrier offset frequency $f_o$ of the CI carriers.

8. A CI filter adapted to separate at least one symbol impressed on at least one CI carrier of a plurality of CI carriers having a frequency spacing of $f_s$, the filter including:
   a sampler adapted to sample the CI signals at a sampling frequency including at least one frequency of a set, the set including a frequency $f_n$ of a desired CI carrier, a harmonic of $f_n$, and a sub-harmonic of $f_n$, the sampler generating a plurality of sample values, a storage device coupled to the sampler, the storage device adapted to collect the samples, a sample selector coupled to the storage device, the sample selector adapted to select and combine one or more groups of samples, and a symbol-interval selector coupled to the sample selector, the symbol-interval selector adapted to control the symbol interval over which the sample selector combines samples.

9. A digital CI filter adapted to separate at least one symbol impressed on at least one carrier of a multicarrier signal characterized by a frequency spacing of $f_s$, the filter including:
   a sampler adapted to collect a plurality of time-domain samples $x_k$ of the multicarrier signal, and a combiner coupled to the sampler, the combiner adapted to combine the samples $x_k$ with respect to the equation $$X(f_n) = \sum_{k=0}^{K-1} x_k \Gamma(t, f_n)$$

over a period of $T_s=1/f_s$ wherein $\Gamma(t,f_n)$ expresses a step function having at least one predetermined frequency $f_n$ and $X(f_n)$ represents a value associated with an information signal modulated onto carrier frequency $f_n$ resulting from a summation of the samples $x_k$, over the period $T_s$.

* * * * *